(12) United States Patent
ElShenawy et al.

(10) Patent No.: US 12,623,684 B1
(45) Date of Patent: May 12, 2026

(54) CROWDSOURCING VEHICLE DATA

(71) Applicant: GM Cruise Holdings LLC, San Francisco, CA (US)

(72) Inventors: Mohamed Mostafa ElShenawy, Burlingame, CA (US); Max Eunice, San Francisco, CA (US); Jennifer Devar McKnew, Petaluma, CA (US); Matthew Douglas Helfgott, San Francisco, CA (US); Alexander Willem Gerrese, San Francisco, CA (US); Nancy Chen, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 174 days.

(21) Appl. No.: 18/475,742

(22) Filed: Sep. 27, 2023

(51) Int. Cl.
B60W 60/00 (2020.01)

(52) U.S. Cl.
CPC ..... B60W 60/001 (2020.02); B60W 2420/408 (2024.01)

(58) Field of Classification Search
None
See application file for complete search history.

(56) References Cited

U.S. PATENT DOCUMENTS

| | | | |
|---|---|---|---|
| 6,476,715 B1 | 11/2002 | Bromer | |
| 9,349,055 B1 * | 5/2016 | Ogale | G05D 1/0231 |
| 9,451,020 B2 * | 9/2016 | Liu | H04L 43/0811 |
| 9,563,798 B1 | 2/2017 | Laser et al. | |
| 9,799,076 B1 | 10/2017 | Medina, III et al. | |
| 9,836,634 B2 | 12/2017 | Xu et al. | |
| 9,953,475 B2 | 4/2018 | Smith et al. | |
| 10,796,567 B1 * | 10/2020 | Tang | G08G 1/207 |
| 11,820,401 B1 * | 11/2023 | Gate | B60W 60/0015 |
| 2012/0230548 A1 | 9/2012 | Calman et al. | |
| 2014/0336848 A1 * | 11/2014 | Saund | G06V 20/13 |
| | | | 701/3 |
| 2017/0301051 A1 * | 10/2017 | Gauglitz | G06Q 50/26 |
| 2018/0032082 A1 * | 2/2018 | Shalev-Shwartz | G06V 20/56 |

(Continued)

FOREIGN PATENT DOCUMENTS

| | | | | |
|---|---|---|---|---|
| WO | WO-2020046797 A1 * | 3/2020 | | H04W 4/40 |

OTHER PUBLICATIONS

H. Chen, B. Guo, Z. Yu and Q. Han, "CrowdTracking: Real-Time Vehicle Tracking Through Mobile Crowdsensing," in IEEE Internet of Things Journal, vol. 6, No. 5, pp. 7570-7583, Oct. 2019 (Year: 2019).*

*Primary Examiner* — Khoi H Tran
*Assistant Examiner* — Dairon Estevez
(74) *Attorney, Agent, or Firm* — Honigman LLP; Matthew H. Szalach; Jonathan P. O'Brien

(57) ABSTRACT

Systems and techniques are provided for crowdsourcing image data depicting autonomous vehicles (AV) to determine user feedback about the AVs based on the image data. An example method can include obtaining a frame captured by a client device and shared by a user of the client device, wherein the frame depicts an AV in a scene where the frame was captured; identifying the AV depicted in the frame based at least in part on a content of the frame; determining, based at least in part on the frame, an issue experienced by the AV in the scene; and determining an action to take in response to at least one of the frame shared by the user and the issue experienced by the AV.

18 Claims, 7 Drawing Sheets

200

(56) References Cited

U.S. PATENT DOCUMENTS

| | | | |
|---|---|---|---|
| 2018/0321686 A1* | 11/2018 | Kanzawa | G05D 1/0246 |
| 2021/0056779 A1* | 2/2021 | Adiththan | G06N 3/006 |
| 2021/0304592 A1* | 9/2021 | Lepp | H04W 4/40 |
| 2021/0357662 A1* | 11/2021 | Hartmann | G06N 20/00 |
| 2022/0355802 A1* | 11/2022 | Chaves | B60W 40/09 |
| 2023/0111391 A1* | 4/2023 | Nayak | B60Q 1/525 |
| | | | 701/301 |
| 2024/0054563 A1* | 2/2024 | Shen | G06V 20/59 |

* cited by examiner

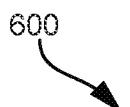

600

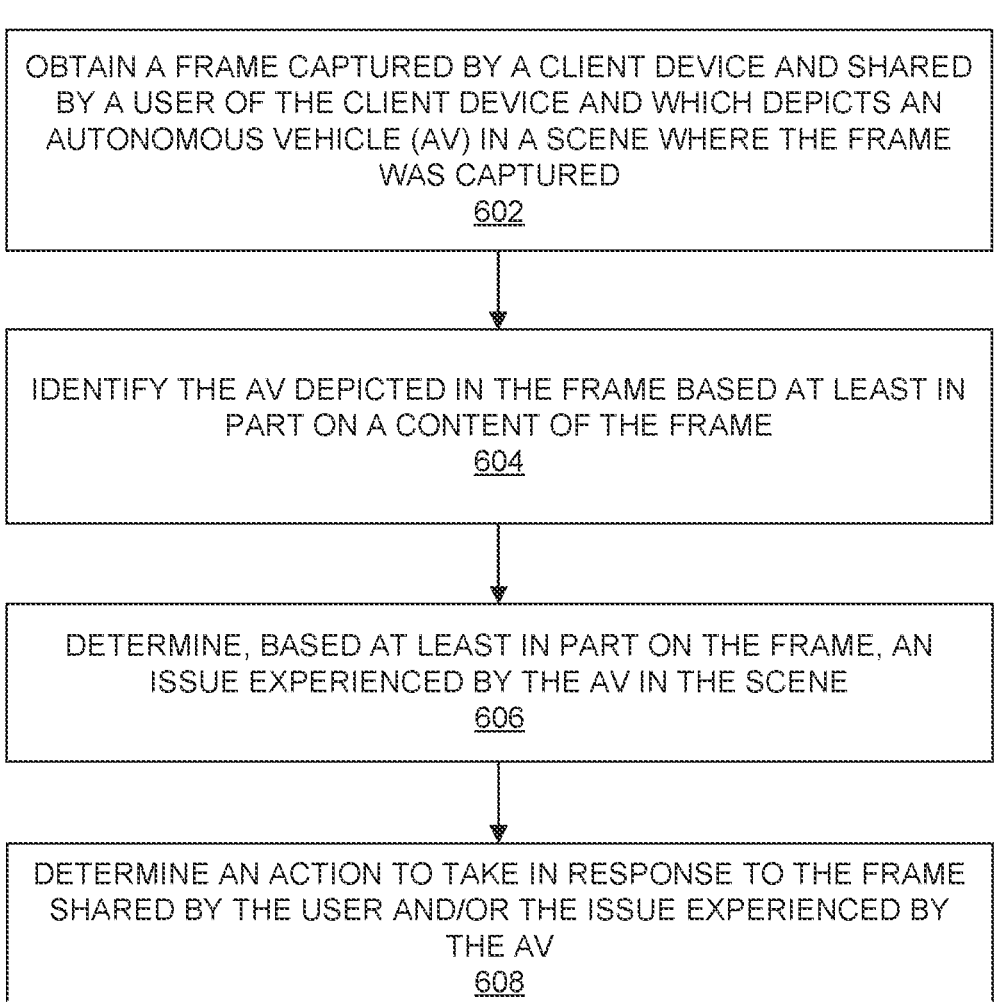

OBTAIN A FRAME CAPTURED BY A CLIENT DEVICE AND SHARED BY A USER OF THE CLIENT DEVICE AND WHICH DEPICTS AN AUTONOMOUS VEHICLE (AV) IN A SCENE WHERE THE FRAME WAS CAPTURED
602

IDENTIFY THE AV DEPICTED IN THE FRAME BASED AT LEAST IN PART ON A CONTENT OF THE FRAME
604

DETERMINE, BASED AT LEAST IN PART ON THE FRAME, AN ISSUE EXPERIENCED BY THE AV IN THE SCENE
606

DETERMINE AN ACTION TO TAKE IN RESPONSE TO THE FRAME SHARED BY THE USER AND/OR THE ISSUE EXPERIENCED BY THE AV
608

FIG. 6

CROWDSOURCING VEHICLE DATA

BACKGROUND

1. Technical Field

The present disclosure generally relates to crowdsourcing vehicle data and, more specifically, using crowdsourced image data depicting a vehicle in a scene to identify and locate the vehicle in the scene, and obtain feedback and/or commands relating to the vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 6 is a flowchart illustrating an example process for crowdsourcing user feedback about an autonomous vehicle, according to some examples of the present disclosure.

DETAILED DESCRIPTION

Figure 1:
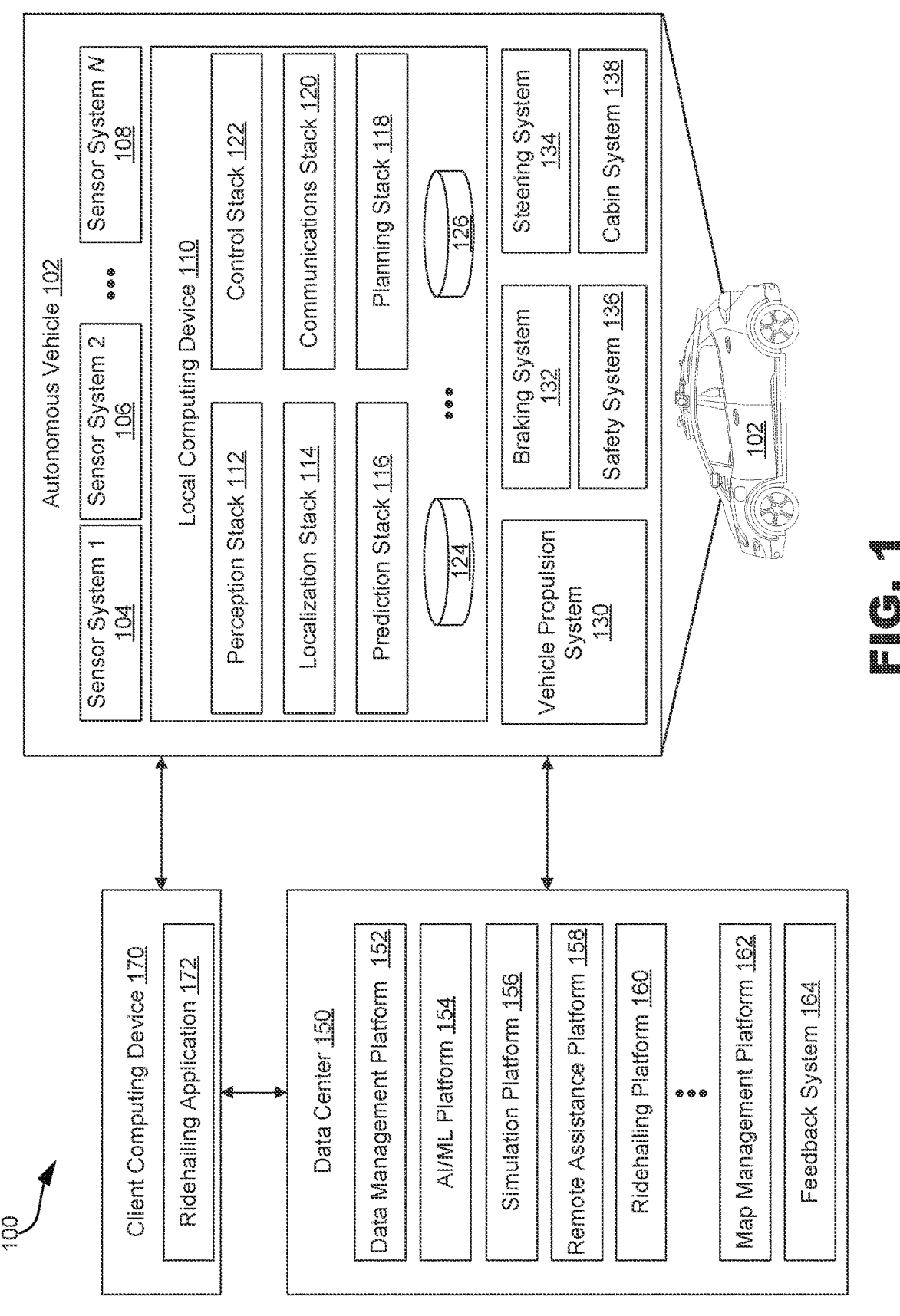
FIG. 1 is a diagram illustrating an example system environment that can be used to facilitate autonomous vehicle navigation and routing operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, a time-of-flight (TOF) sensor, an inertial measurement unit (IMU), and/or an acoustic sensor (e.g., sound navigation and ranging (SONAR), microphone, etc.), global navigation satellite system (GNSS) and/or global positioning system (GPS) receiver, amongst others. The AVs can use the various sensors to collect data and measurements that the AVs can use for AV operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the data and measurements to an internal computing system of the autonomous vehicle, which can use the data and measurements to control a mechanical system of the autonomous vehicle, such as a vehicle propulsion system, a braking system, and/or a steering system, for example.

Not surprisingly, AVs are rapidly advancing in technology and deployment. As AVs are increasingly integrated into different environments, users (e.g., pedestrians, drivers, etc.) are encountering AVs on the road with increasing frequency. When users encounter AVs on the road, the users can observe the behavior, performance, and/or condition of the AVs, which can allow such users to provide valuable insights to AVs and AV developers. However, users typically do not have a simple or user-friendly way to provide feedback about AVs they encounter on the road. Yet allowing users to provide feedback about the behavior, performance, and/or condition of AVs they encounter on the road can be very valuable and can offer a number of advantages. For example, a user who encounters an AV in a scene can observe the behavior of the AV in a given situation and provide feedback that can be used to improve an operation and/or behavior of the AV (and/or other AVs in a fleet of AVs) in the given situation (and/or other similar or relevant situations).

Indeed, user feedback about AVs can provide valuable insights into the performance and/or operation of AVs in various scenarios. By incorporating real-world user observations and experiences, AVs and/or AV developers can identify and rectify issues, optimize systems and/or algorithms implemented by the AVs, and/or provide improvements for the AVs. Moreover, user acceptance of AVs may increase when the users perceive that their opinions are heard and considered. Allowing users to provide feedback about AVs they encounter on the road can also foster transparency and accountability, resulting in increased comfort with and acceptance of AV technology.

User feedback can also serve as an additional source of validation for AV behaviors in real-world scenarios. This user feedback can be used to verify that the AV technology performs as expected in diverse and complex environments. Users can also provide feedback when they encounter unexpected or anomalous behavior exhibited by AVs, which can be used to improve the behavior of AVs and/or identify potential optimizations to AV systems. Moreover, user feedback about the behavior, performance, and/or condition of AVs can support continuous learning for AVs. By analyzing user-reported feedback, AVs can adapt and learn from real-world experiences. This adaptive learning process enables AVs to different scenarios more effectively, improving their overall performance.

As illustrated, allowing users to provide feedback about the behavior, performance, and/or condition of AVs can provide a wide range of benefits such as, for example and without limitation, improved system performance, increased user trust, real-world data validation, anomaly detection, continuous learning, and customization. Unfortunately, as previously noted, users typically do not have a simple or user-friendly way to provide feedback about AVs they encounter on the road.

Systems, apparatuses, processes (also referred to as methods), and computer-readable media (collectively referred to as "systems and techniques") are described herein for crowdsourcing vehicle data, such as data from users providing feedback about the behavior/operation, performance, and/or condition of AVs. In some examples, the systems and techniques described herein can obtain and use crowdsourced image data (e.g., still images and/or video frames) depicting an AV in a scene to identify the AV depicted in the image data, locate the AV in the scene, and obtain feedback/insights about the identified AV.

For example, when a user in a scene encounters an AV and the user wants to seamlessly report something about the AV (e.g., a behavior or operation of the AV, a performance of the AV, a condition of the AV, a situation involving the AV, etc.) to an entity managing and/or operating the AV (e.g., an AV company, service, and/or developer), the user can use a camera sensor of a client device (e.g., a mobile phone, a tablet computer, a smart watch, smart goggles, etc.) of the user to capture a frame (e.g., a still image or video frame) depicting the AV and either send the captured frame to the entity (e.g., via a client application or platform associated with the entity, via a messaging service, via an electronic communications service, etc.) or post (and/or upload) the captured frame on a site accessible by a system of the entity (e.g., a social media site, a blog or website, etc.). To illustrate, if a user in a scene encounters an AV performing a maneuver that the user believes is improper in a given scenario, the user can seamlessly report the AV by using a client device to capture a frame of the AV and sending the captured frame to an entity managing and/or operating the AV (e.g., an AV company, service, and/or developer) or posting (and/or uploading) the captured frame on a site accessible by a system of the entity.

A backend system associated with the entity can receive the captured frame or retrieve the captured frame from a post (and/or uploaded destination) and use the captured frame to identify and locate the AV. The backend system can analyze the captured frame to determine what the user intended to report via the captured frame. For example, the backend system can determine a condition, behavior/operation, and/or state of the AV as depicted in the captured frame to understand what the user intended to report about the AV. To illustrate, if the captured frame depicts the AV parked/stopped in a no parking/stopping lane, the backend system can determine from the captured frame that the user intended to report the AV incorrectly parking/stopping in the no parking/stopping lane. In some cases, the backend system can additionally or alternatively analyze log and/or sensor data from the AV corresponding to a period of time before the frame was captured, when the frame was captured, and/or after the frame was captured to determine a behavior/operation, performance, state, and/or condition of the AV within a time period associated with the captured frame in order to determine what the user may have intended to report about the AV.

In some examples, the backend system can process the captured frame to identify a characteristic(s) of the AV as depicted in the captured frame, and identify the AV based on the characteristic(s) of the AV determined from the captured frame. The characteristic(s) of the AV determined from the captured frame and used to identify the AV can include, for example and without limitation, a shape and/or size of the AV, a color(s) of the AV, a visual pattern on the AV, a model of the AV, a maker of the AV, a license plate of the AV, a configuration of the AV, one or more objects and/or devices on the AV, a visual/visible feature of the AV (e.g., a dent, a missing component such as a bumper, a defect, a visual condition, a condition or detail of the paint of the AV, a visible symbol, a visible text, a visual marking on the AV, etc.), and/or any other features of the AV depicted in the captured frame. To identify the AV based on the characteristic(s) of the AV extracted from the captured frame, the backend system can compare the characteristic(s) of the AV with known characteristics of one or more AVs associated with the backend system such as a fleet of AVs operated and/or managed by an entity associated with the backend system. The backend system can identify the AV based on a match and/or similarity (and/or a distance metric) between the characteristic(s) of the AV extracted from the captured frame and a known characteristic(s) associated with the AV. In some aspects, once the backend system has identified the AV (and/or as part of identifying the AV), the backend system can locate the identified AV. For example, the backend system can track a location of the AV as well as any other AV associated with the backend system, such as a fleet of AVs associated with the backend system. Thus, the backend system can use the identity of the AV to retrieve the tracked location of the AV.

In some cases, the backend system can additionally or alternatively identify and locate the AV based on a location of the client device used to capture the frame relative to a tracked location(s) of one or more AVs (e.g., including the AV) associated with the backend system (e.g., relative to the locations of AVs in a fleet of AVs), an orientation and/or pose (e.g., position and orientation) of the AV as depicted in the captured frame relative to an orientation and/or pose of the client device (or vice versa), a heading of the client device and/or a direction in which the image sensor of the client device is pointed relative to a heading/direction of the AV depicted in the captured frame (e.g., as determined based on the captured frame, data from a global positioning system of the client device and/or the AV, data from a sensor of the client device and/or the AV such as a gyroscope or an inertial measurement unit, etc.), a location of one or more scene elements (e.g., buildings, streets, landmarks, vehicles, trains, structures, etc.) depicted in the captured frame, and/or data provided by the client device (e.g., via an input from the user, via metadata included with/in the captured frame, via data collected by one or more sensors on the client device, etc.).

For example, in some cases, the backend system can detect one or more scene elements depicted in the captured frame and determine a location of the AV and/or the client device based on a determined location of the one or more scene elements detected in the captured frame. To illustrate, if the backend system determines that the captured frame depicts the one or more scene elements, the backend system can determine that the AV and the client device are within a proximity of the one or more scene elements and/or within a region/area associated with the one or more scene elements. In some examples, the backend system can determine a location of the one or more scene elements and estimate a location, proximity, and/or region of the AV and/or the client device based on the location of the one or more scene elements.

In some cases, the backend system can determine the location of the one or more scene elements by identifying the one or more scene elements and searching for a location of the identified one or more scene elements. In other cases, the backend system can additionally or alternatively determine the location of the one or more scene elements based on sensor data (e.g., camera sensor data, LIDAR data, RADAR data, ultrasound sensor data, global positioning system (GPS) data, etc.) collected by one or more AVs associated with the backend system, such as one or more AVs in a fleet of AVs associated with the backend system. For example, as previously noted, AVs can capture various types of sensor data as they navigate environments. The sensor data captured by one or more AVs or a fleet of AVs can be used to identify and/or locate scene elements in one or more environments, such as the one or more scene elements depicted in the captured frame. To illustrate, an AV in a fleet of AVs can capture a frame depicting a scene element as the AV navigates a scene where the scene element is located. The backend system (or the AV) can analyze the captured frame to determine that the scene element is depicted in the captured frame. The backend system (or the AV) can determine the location of the AV (e.g., based on a tracked location of the AV determined from data collected by one or more sensors) when the frame was captured, and locate the AV and/or the client device based on the location of the AV when the frame was captured.

In some cases, the backend system can determine the location, orientation, and/or pose of the client device based on metadata included in the captured frame. For example, in some cases, the captured frame can include metadata that identifies a location of the client device determined from a GPS device on the client device, an orientation of the client device determined by a gyroscope and/or inertial measurement unit (IMU) on the client device, and/or a pose of the client device determined by one or more sensors of the client device (e.g., a gyroscope, a GPS receiver, an IMU, etc.). The backend system can thus extract the location, orientation, and/or pose of the client device from the metadata of the captured frame. In some examples, the backend system can use the location, orientation, and/or pose of the client device to identify and/or locate the AV. For example, the backend system can compare the location of the client device with the location of any AVs associated with the backend system (e.g., including the AV). Based on the comparison and the captured frame, the backend system can determine which AV(s) is/are within a threshold proximity to the client device to identify and locate the relevant AV (e.g., the AV depicted in the captured frame).

In some cases, if the user provides the captured frame via a client application associated with the backend system, the backend system can obtain information about the client device from the client application, such as a location of the client device when the frame was captured and/or sent via the client application. For example, the client application can obtain a location, orientation, heading, and/or pose of the client device from one or more sensors on the client device, and provide such information to the backend system along with the captured frame. The backend system can use the captured frame and such information to identify and locate the relevant AV, and determine what the user may have intended to report about the AV.

In some examples, the identified AV can be the AV determined to be closest to the client device. In some cases, the identity of the relevant AV may not be sufficiently clear from the comparison of the location of the client device and the location of AVs. For example, if there are multiple AVs within a threshold proximity to the client device, within a threshold proximity to each other, and/or having less than a threshold difference in their respective proximities to the client device and/or each other, the location of the client device and the locations of such AVs may not be sufficient to identify which of the AVs is the relevant AV. In such cases, the backend system can determine which of the AVs is the relevant AV based on the captured frame (e.g., by identifying the AV in the captured frame), based on an orientation and/or pose of the AVs relative to the client device, based on an orientation and/or pose of the AV depicted in the captured frame, and/or based on a content of the captured frame (e.g., which AV is in a foreground of the captured frame, which AV is best aligned within the captured frame or a center of the captured frame, which AV is fully or most contained within the captured frame, an estimated behavior and/or operation of the relevant AV depicted in the captured frame, etc.).

For example, the backend system can determine which AV from among multiple AVs within a proximity to each other is the relevant AV being reported by the user via the captured frame based on the orientation and/or pose of one or more AVs depicted in the captured frame, the orientation and/or pose of the client device relative to the one or more AVs depicted in the captured frame, an estimated focus or target of the captured frame, a location within the captured frame (e.g., background, foreground, center, edge, etc.) of one or more AVs depicted in the captured frame, what portion of an AV is depicted in the captured frame (e.g., the entire AV, a truncated portion, a rear portion, a front portion, a side portion, etc.), a route of each AV depicted in the captured frame, information about a maneuver/behavior implemented and/or planned to be implemented by each AV depicted in the captured frame (e.g., is the AV stationary, moving, turning, stopping, parking, merging, etc.), and/or other information about any AVs depicted in the captured frame.

In some aspects, when a user provides a captured frame depicting an AV, the backend system can solicit information from the user. For example, if the user submits the captured frame via a client application associated with the backend system, the backend system can provide to the client device a user interface with one or more input options for presentation via the client application. In some examples, the user interface can include an option for the user to input information about the AV and/or the situation, describe and/or identify what the user intends to report about the AV, identify what the user believes should be corrected with respect to the AV, identify how the user believes the AV should have behaved/operated, and/or any other information about the AV, the scene, the user, and/or the situation. For example, the user interface can include a map identifying a route and/or behavior of the AV where the user can provide an input (e.g., by moving interface elements such as a depicted AV or a depicted stopping line) identifying how the user believes the AV should have behaved/operated in the relevant situation (e.g., indicating how the behavior/operation of the AV in the relevant situation should be adjusted). The backend system can use the input provided by the user as feedback about the AV.

As another example, the user interface can include a video (e.g., a sequence of frames) depicting an operation of the AV within a period before and/or after the time when the frame was captured and/or reported. To illustrate, if the backend system is unable to identify what the user intended to report about the AV when the user submitted the captured frame, the backend system can provide a video (e.g., a sequence of frames) depicting the AV during a relevant period of time, for presentation at the client device via the user interface. The user can review the video to identify the particular behavior/operation of the AV that the user intended to report, and can provide an input identifying such behavior/operation and/or a frame(s) in the sequence of frames that depicts such behavior/operation. In some examples, the video depicting the AV can include frames captured by the AV and/or one or more other AVs in the scene at the relevant time(s). For example, as previously noted, AVs in a fleet of AVs can continuously collect sensor data, including image data (e.g., frames), while navigating environments. Therefore, if there were other AVs in the scene around the time when the user captured and/or submitted the frame depicting the AV, the backend system can retrieve one or more frames collected by other vehicles that depict the AV being reported during a relevant period of time(s). The backend system can provide a video (e.g., a sequence of frames) from the other AVs to the client device for presentation via the user interface and/or a screenshot from one or more frames in the video.

In some cases, the backend system can provide incentives for users to report AVs when the users witness certain behaviors/operations, performances, states, events, and/or conditions associated with an AV. For example, the backend system can provide discounts, loyalty points, AV user/service status upgrades, and/or credits to AV ridesharing and/or product delivery services to users who report AVs as described herein. As another example, the backend system can provide additional or complimentary AV services and/or service features/offerings to users who report AVs as described herein. As yet another example, the backend system can adjust a service priority assigned to a user requesting an AV service as incentive for reporting AVs as described herein.

In some aspects, the backend system can reply to users when the users report an AV via a captured frame. For example, when a user submits a frame depicting an AV in order to report a behavior/operation of the AV, the backend system can reply with an image or video depicting the user from the perspective of the AV (or another AV) as a way of thanking the user for their feedback. In some examples, the image or video can be retrieved from stored frames captured by the AV during a relevant period of time. For example, since the AV captures frames continuously while navigating a scene as previously explained, when a user provides a captured frame to report the AV, the backend system can determine a timestamp associated with the captured frame (and/or associated with the time when the captured frame was reported) and use the timestamp to identify a stored frame(s) collected by the AV around the time of the incident. The stored frame(s) can include a frame that depicts the user from the perspective of the AV.

In some cases, when a user posts an image or video of an AV in a particular situation and the image or video may not fully or accurately capture a context of the particular situation, the backend system can reply to such post with one or more frames that provide more information about the context associated with the particular situation. For example, the backend system can retrieve one or more frames captured by the AV (and/or captured by one or more other AVs in the scene) before and during the particular situation, and post the retrieved one or more frames as a reply to the user's post. The one or more frames posted by the backend system can provide additional context about the particular situation.

In some cases, the backend system can use a captured frame depicting an AV to provide commands to the AV and/or provide assistance to the AV and/or a user associated with the AV. For example, if an emergency responder or a field operator/technician needs access to the AV, the emergency responder or the field operator/technician can use a client device to capture an image of the AV and send the captured image to the backend system. The backend system can obtain the captured image and identify and locate the AV as previously described, and send a command to the AV configured to unlock a door of the AV to provide the emergency responder or field operator/technician access to the AV. As another example, if an emergency responder needs the AV to move from a location of the AV to a different location, the emergency responder can similarly capture an image of the AV and send the image to the backend system. The backend system can identify the AV and send the AV a command(s) configured to trigger the AV to move to the different location.

In some cases, the backend system can provide feedback from users and/or captured frames from users to a remote assistance operator(s) who can use such information to assist an AV in need of assistance. For example, if an AV is stuck in an intersection (e.g., stopped and unable to autonomously continue through the intersection) and a user captures an image of the stuck AV and sends the image to the backend system (or posts the image to a site), the backend system can use the captured image and any information determined by the backend system based on the user's reporting of the captured image to trigger remote assistance to the AV and/or provide such information to a remote assistance operator assigned to provide assistance to the AV. The information can be used to assist the AV in recovering from the stuck state (e.g., to proceed through the intersection when possible).

Examples of the systems and techniques described herein for processing data are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

In some examples, the planning stack 118 can include multiple planning stacks and/or multiple planners (e.g., multiple planning stacks, multiple planning algorithms, multiple planning models, multiple planning nodes, multiple planning software and/or services, and/or multiple planning components) that the AV 102 can use to perform different maneuvers (and/or types of maneuvers), implement different parameters (e.g., different rules, different restrictions, different metrics, different standards, different states, and/or different behaviors), and/or navigate different scenes/environments (and/or types of scenes/environments), different conditions, different limitations, etc. For example, in some cases, the planning stack 118 can include a navigation planner and a specialized planner, as previously described. In some examples, the planning stack 118 can additionally or alternatively include other planners and/or a different number of planners. The local computing device 110 can intelligently and autonomously switch between different planners in/of the planning stack 118, as further described herein. For example, the local computing device 110 can autonomously switch between different planners in/of the planning stack 118 based on one or more factors such as, without limitation, a traffic rule, a restriction, a behavior, a scene, a state of the AV 102, a metric, a condition, a limitation, etc.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

Moreover, the local computing device 110 of the AV 102 can implement one or more AI/ML models to process data that the AI/ML models can use to make or generate various outputs, decisions, calculations, and/or predictions that the AV 102 can use to operate in an environment. For example, the perception stack, the localization stack 114, the prediction stack 116, the planning stack 188, the communications stack 120, the control stack 122, and/or any other software stack of the AV 102 can implement one or more AI/ML models used to process AV data.

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, a ridehailing platform 160, a map management platform 162, and a feedback system 164, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridesharing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eye-glasses or other Head-Mounted Display (HMD), smart ear pods, or other smart in-ear, on-ear, or over-ear device, etc.), gaming system, or any other computing device for accessing the ridehailing application 172. In some cases, the client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs (e.g., AV 102), Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the client application (e.g., ridehailing application 172) to enable passengers to view the AV 102 in transit to a pick-up or drop-off location, and so on.

The feedback system 164 can include one or more computing devices, nodes, algorithms, models, applications, virtual machines, software containers, and/or components for obtaining and processing data reported from users about the AV 102 (and any other AV associated with the data center 150 such as a fleet of AVs) to determine user feedback associated with the reported data and optionally determine any actions to implement in response to and/or based on such feedback. For example, as further described herein, the feedback system 164 can obtain and process a frame(s) captured by a user using the client computing device 170 to report feedback about the AV 102. The frame(s) can depict the AV 102 in a scene, which the feedback system 164 can use to identify and locate the AV 102, determine what the user may have intended to report using the frame(s) (e.g., determine user feedback associated with the frame(s)), and optionally determine any actions to implement in response to and/or based on the reported information (e.g., user feedback). The feedback system 164 can receive the frame(s) from the client computing device 170 (e.g., the client computing device 170 can send the frame(s) to the feedback system 164 via an application such as the ridehailing application 172) or retrieve the frame(s) from a post or communication including the frame(s) which can be submitted by the client computing device 170 to a site (e.g., a social media network, a blog, a website, etc.).

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
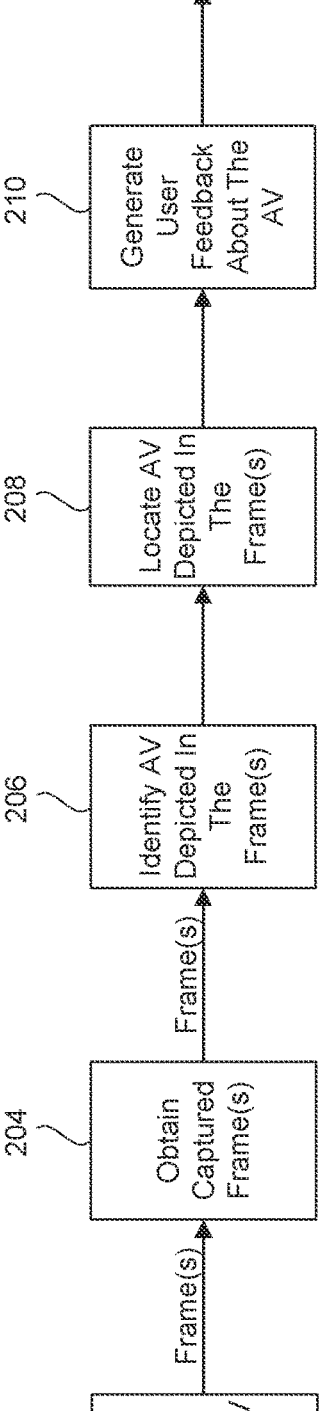
FIG. 2 is a flowchart illustrating an example process for crowdsourcing user feedback about an autonomous vehicle, according to some examples of the present disclosure.

FIG. 2 is a flowchart illustrating an example process 200 for crowdsourcing user feedback about an AV (e.g., AV 102), according to some examples of the present disclosure. In this example, at block 202, the process 200 can include capturing a frame(s) depicting an AV in a scene. The frame(s) can be used to image or record the AV in a particular scenario and used to report something about the AV in the particular scenario, as further described herein. For example, when a user encounters the AV in a scene and identifies something about the AV, the AV's behavior/operation, the AV's performance, the AV's state, and/or a condition of the AV that the user wishes to report, the user can use a client device of the user (e.g., client computing device 170) to capture a frame(s) depicting the AV in the particular scenario. The frame(s) can depict the AV and can thus be used to identify and/or locate the AV. In some cases, the frame(s) can also depict something about the AV that the user wishes to report, such as a behavior/operation of the AV, a performance of the AV, a state of the AV, a condition of the AV, and/or anything else about the AV. Thus, in such examples, the frame(s) can be used to determine what the user who captured the frame(s) may have intended to report about the AV using the captured frame(s) depicting the AV. In other cases, the frame(s) may not depict something about the AV that the user wishes to report. In such cases, the frame(s) may not provide sufficient information to determine from the frame(s) what the user who captured the frame(s) may have intended to report about the AV using the captured frame(s) depicting the AV. However, as further described herein, a feedback system (e.g., feedback system 164) may use additional information about and/or from the AV, the user that captured the frame(s), the client device associated with the user that captured the frame(s), a scene of the AV, and/or one or more sensors of one or more AVs in the scene to determine what the user who captured the frame(s) may have intended to report about the AV using the captured frame(s) depicting the AV.

At block 204, the process 200 can include obtaining the frame(s) captured by the user and depicting the AV in the scene. For example, the feedback system 164 can obtain the frame(s) captured by the user from a client device (e.g., client computing device 170) associated with the user, a storage location, a server, a site, and/or any location where the user stored, uploaded, posted, and/or sent the frame(s). In some cases, the user who captured the frame(s) can use the client device of the user (e.g., the client computing device 170) to send the frame(s) to the feedback system 164 (e.g., via an application on the client device, such as ridehailing application 172). Here, the feedback system 164 can receive the frame(s) from the client device of the user. In other cases, the user who captured the frame(s) can use the client device to post and/or upload the frame(s) in/to a remote destination such as, for example and without limitation, a social media network, a blog, a website, a messaging system, a content platform, a server, a remote storage, and/or any other remote destination. Here, the feedback system 164 can retrieve the frame(s) from the remote destination.

For example, in some cases, the user who captured the frame(s) can use the client device to post the frame(s) to a social media network and include a tag that the feedback system 164 can use to find the posted frame(s) in the social media network, determine that the posted frame(s) provides feedback and/or other information about an AV associated with the feedback system 164, and retrieve the posted frame(s) from the social media network for processing as further described herein. As another example, the user who captured the frame(s) can use the client device to post the frame(s) to a blog or website accessible to the feedback system 164, where the feedback system 164 can obtain frames about AVs posted by users to provide feedback and/or other information about such AVs. The feedback system 164 can use to find the posted frame(s) in the blog or website, determine that the posted frame(s) provides feedback and/or other information about an AV associated with the feedback system 164, and retrieve the posted frame(s) from the blog or website for processing as further described herein.

At block 206, the process 200 can include identifying the AV depicted in the frame(s) based at least partly on the captured frame(s). In some examples, the feedback system 164 can process the frame(s) to detect the AV depicted in the frame(s) and identify the AV based at least partly on the frame(s). For example, the feedback system 164 can implement a neural network configured to extract features in image data, such as the captured frame(s), and use the extracted features to detect and identify the AV depicted in the frame(s) using image processing (e.g., object detection, object classification, object recognition, etc.).

In some examples, the feedback system 164 can process the captured frame(s) (e.g., using a machine learning model(s) and/or a classical image processing and/or computer vision algorithm) to extract from the frame(s) one or more features depicting, representing, and/or corresponding to a characteristic(s) of the AV as depicted in the captured frame(s). The feedback system 164 can use the extracted one or more features to determine the characteristic(s) of the AV and use the characteristic(s) of the AV to identify the AV. The characteristic(s) of the AV determined from the frame(s) depicting the AV and used to identify the AV can include any characteristic(s) of the AV depicted, contained in, and/or represented by the frame(s) such as, for example and without limitation, a shape and/or size of the AV; a color(s) of the AV; a visual pattern on the AV; a model of the AV; a maker of the AV; a license plate of the AV; a configuration of the AV; an appearance of the AV; one or more objects and/or devices on the AV; a feature of the AV depicted in the frame(s) such as a visible dent, a component that is visibly missing (e.g., a bumper, a light or lighting system, a sensor, a mirror, etc.); a visibly identifiable replacement component on the AV (e.g., a spare tire, a replacement door, a replacement object or device, a replacement bumper, a replacement window, a replacement door, a replacement paint and/or paint marking(s), a replacement sensor(s), etc.); a visible defect; a visible condition of the AV; a condition or detail of the paint of the AV; a visible symbol on the AV; a visible text such as a text marking or a vehicle name or identifier; a visual marking on the AV; and/or any other features, attributes, and/or details of and/or about the AV that is/are depicted in the captured frame(s).

For example, to identify the AV depicted in the frame(s) based on the characteristic(s) of the AV extracted from the captured frame(s), the feedback system 164 can compare such characteristic(s) of the AV with one or more known characteristics of one or more AVs associated with the feedback system 164 such as known characteristics of AVs in a fleet of AVs associated with the feedback system 164 (e.g., operated, owned, and/or managed by an entity associated with the feedback system 164). In this example, the feedback system 164 can identify the AV based on a match, a similarity metric, and/or a distance metric between the characteristic(s) of the AV extracted from the captured frame(s) and a known characteristic(s) of the AV (e.g., from the one or more known characteristics of the one or more AVs associated with the feedback system 164).

In some cases, the feedback system 164 can additionally or alternatively identify the AV depicted in the frame(s) based on a location of the client device used to capture the frame(s) (e.g., local computing device 170) relative to a tracked location(s) of one or more AVs (e.g., including the AV depicted in the frame(s)) associated with the feedback system 164 (e.g., relative to the locations of AVs in a fleet of AVs), an orientation and/or pose (e.g., position and orientation) of the AV as depicted in the captured frame(s) relative to an orientation and/or pose of the client device (or vice versa), a heading of the client device and/or a direction in which the image sensor of the client device is pointed relative to a heading/direction of the AV (or vice versa) depicted in the captured frame(s) (e.g., as determined based on the captured frame(s), data from a GPS(s) of the client device and/or the AV, data from a sensor(s) of the client device and/or the AV such as a gyroscope or an IMU, etc.), a location of one or more scene elements (e.g., buildings, streets, landmarks, vehicles, trains, structures, signs, etc.) depicted in the captured frame(s), metadata of the captured frame(s), and/or data provided by the client device (e.g., from an input from the user, from one or more sensors on the client device, etc.).

For example, in some cases, the feedback system 164 can determine the location of the client device used to capture the frame(s) based on location information provided by the client device from one or more sensors of the client device (e.g., from a GPS receiver, etc.) and/or included in metadata of the frame(s). The location information can indicate a location of the client device when the frame(s) was captured or submitted. The feedback system 164 can use the location to search the tracked locations of any AVs associated with the feedback system 164 to determine what AVs are located within a threshold proximity to the location of the client device and/or were located within a threshold proximity to the location of the client device when the frame(s) was captured and/or submitted. If the feedback system 164 determines that a particular AV is within the threshold proximity to the client device or was within the threshold proximity when the frame(s) was captured and/or submitted, the feedback system 164 can determine that the particular AV is the AV depicted in the frame(s) and identify the AV.

In some cases, the feedback system 164 can detect one or more scene elements depicted in the captured frame(s) and determine a location of the AV and/or the client device based on a determined location of the one or more scene elements detected in the captured frame. The feedback system 164 can use the location of the AV and/or the client device to identify (and locate) the AV depicted in the frame(s). For example, if the feedback system 164 determines that the captured frame(s) depicts a landmark (e.g., the feedback system 164 detects the landmark in the captured frame(s)), the feedback system 164 can determine that the client device and the relevant AV are within a proximity of the landmark and/or within a region/area associated with the landmark. The feedback system 164 can search any tracked locations available to the feedback system 164 for one or more AVs associated with the feedback system 164 to determine an AV that is within a threshold proximity to the location of the landmark (and/or were within the threshold proximity to the location of the landmark when the frame(s) was captured and/or submitted). The feedback system 164 can determine that such AV within the threshold proximity to the location of the landmark is the relevant AV and can identify the AV once the feedback system 164 has determined which AV corresponds to the frame(s).

In some cases, the feedback system 164 can determine a location of one or more scene elements (e.g., the landmark) depicted in the frame(s) and estimate a location, proximity, and/or region of the AV and/or the client device based on the location of the one or more scene elements. The feedback system 164 can use the location of the one or more scene elements to determine, based on tracked locations of AVs associated with the feedback system 164, which AV is the relevant AV depicted in the frame(s) and identify such AV. In some examples, the feedback system 164 can determine the location of the one or more scene elements depicted on the frame(s) by detecting the one or more scene elements in the frame(s) and searching for a location of the one or more identified scene elements. For example, the feedback system 164 can detect a landmark depicted in the frame(s) and search for the known location of the landmark to identify the location of the landmark.

In some cases, the feedback system 164 can additionally or alternatively determine the location of the one or more scene elements based on sensor data (e.g., camera sensor data, LIDAR data, RADAR data, ultrasound sensor data, GPS data, etc.) collected by one or more AVs associated with the feedback system 164, such as the AV depicted in the frame(s) and any other AVs in a fleet of AVs associated with the feedback system 164. For example, AVs can capture various types of sensor data as they navigate environments. The sensor data captured by one or more AVs or a fleet of AVs can be used to identify (and/or locate) scene elements in one or more environments, such as a scene element depicted in the captured frame(s). To illustrate, an AV can capture one or more frames depicting a scene element as the AV navigates the scene where the scene element is located. The feedback system 164 (or the AV) can analyze the one or more frames to determine that the scene element is depicted in the captured frame(s) depicting the relevant AV. Since the scene element is depicted in the one or more frames captured by the AV, the feedback system 164 can determine that the AV depicted in the captured frame(s), which also depicts the scene element, is and/or was within a proximity to the scene element and use the location of the scene element to determine which AV within any AVs associated with the feedback system 164 is the AV depicted in the frame(s). For example, the feedback system 164 can compare a determined location of the scene element with tracked locations of any AVs associated with the feedback system 164 to determine which AV is/was within a proximity to the scene element and is likely the relevant AV depicted in the frame(s).

In some cases, the feedback system 164 can determine the location, orientation, and/or pose of the client device based on metadata included in the captured frame(s). For example, in some cases, the captured frame(s) can include metadata that identifies a location of the client device determined from a GPS device on the client device, an orientation of the client device determined by a gyroscope and/or IMU on the client device, and/or a pose of the client device determined by one or more sensors of the client device (e.g., a gyroscope, a GPS receiver, an IMU, etc.). The feedback system 164 can extract the location, orientation, and/or pose of the client device from the metadata of the captured frame(s). In some examples, the feedback system 164 can use the location, orientation, and/or pose of the client device to determine which AV is depicted in the frame(s) and identify (and/or locate) the AV depicted in the frame(s). For example, the feedback system 164 can compare the location of the client device with the location of any AVs associated with the feedback system 164 (e.g., including the AV depicted in the frame(s)). Based on the comparison, the feedback system 164 can determine which AV(s) is/are within a threshold proximity to the client device to identify (and/or locate) the relevant AV (e.g., the AV depicted in the captured frame(s)).

In some cases, if the user provides the captured frame(s) via a client application associated with the feedback system 164 (e.g., via ridehailing application 172), the feedback system 164 can obtain information about the client device from the client application, such as a location of the client device when the frame(s) was captured and/or sent via the client application, a timestamp associated with the frame(s), an orientation and/or pose of the client device (e.g., when the frame(s) was captured), and/or other information about the client device. For example, the client application can obtain a location, orientation, heading, and/or pose of the client device from one or more sensors on the client device, and provide such information to the feedback system 164 along with the captured frame(s) and/or include such information in metadata of the captured frame(s). The feedback system 164 can use such information to identify (and/or locate) the AV depicted in the frame(s). For example, the feedback system 164 can determine the tracked locations of one or more AVs and the route traversed by the one or more AVs during a relevant period of time when the frame(s) was captured. The feedback system 164 can determine which AV was, during the relevant period of time, at a location where such AV may have been within the field-of-view (FOV) of the camera sensor of the client device when the client device captured the frame(s) in order to determine which AV is the AV depicted in the frame(s) and identify such AV.

In some cases, the feedback system 164 can also determine, based on the route traversed by an AV during the relevant period of time, the heading and/or orientation of such AV during the relevant period of time. The feedback system 164 can use such information (e.g., the heading and/or orientation of the AV) to determine if the heading and/or orientation of the AV during the relevant period of time matches (or has a threshold similarity to) the heading and/or orientation of the AV depicted in the frame(s) (e.g., as depicted in the frame(s)). If the heading and/or orientation of the AV during the relevant period of time matches (or has a threshold similarity to) the heading and/or orientation of the AV depicted in the frame(s), the feedback system 164 can determine that such AV is the relevant AV depicted in the frame(s) and thereby identify the AV.

In some examples, the identified AV can be the AV determined to be closest to the client device at a particular time (e.g., when the frame(s) was captured) and/or determined to have a certain orientation/heading at the particular time that matches (and/or has a threshold similarity to) the orientation/heading of the AV depicted in the frame(s) (as depicted in the frame(s)). In some cases, the identity of the relevant AV may not be sufficiently clear from a comparison of the location of the client device and the tracked location of AVs associated with the feedback system 164. For example, if there are multiple AVs within a threshold proximity to the client device, within a threshold proximity to each other, and/or having less than a threshold difference in their respective proximities to the client device and/or each other, the location of the client device and the locations of such AVs may not be sufficient to identify which of the AVs is the relevant AV depicted in the frame(s). In such cases, the feedback system 164 can determine which of the AVs is the relevant AV depicted in the frame(s) based on the captured frame (e.g., by identifying the AV in the frame(s) and/or one or more characteristics of the AV depicted in the frame(s), as previously explained), based on an orientation and/or pose of the AVs relative to the client device, based on an orientation and/or pose of the AV depicted in the captured frame(s), and/or based on a content of the captured frame(s).

For example, to disambiguate which AV within a region containing multiple AVs (and/or which AV from multiple AVs depicted in the frame(s) if the frame(s) depicts multiple AVs) is the relevant AV depicted in the frame(s) that the user who captured the frame(s) intended to report information about via the captured frame(s)), the feedback system 164 can review the content of the captured frame(s) to determine which AV is in a foreground of the captured frame(s), which AV is best aligned within the captured frame(s) or a center of the captured frame(s), which AV is fully or most contained within the captured frame(s), a behavior and/or operation of the AV depicted in the captured frame(s), etc. The feedback system 164 can use such information (e.g., which AV is in a foreground of the captured frame(s), which AV is best aligned within the captured frame(s) or a center of the captured frame(s), which AV is fully or most contained within the captured frame(s), a behavior and/or operation of the AV depicted in the captured frame(s), etc.) to identify which specific AV is the relevant AV depicted in the frame(s) and being reported by the user who captured the frame(s).

In some examples, the feedback system 164 can determine which AV from among multiple AVs within a proximity to each other is the relevant AV depicted in the frame(s) and being reported by the user who captured the frame(s) based on the orientation and/or pose of any AVs depicted in the captured frame(s), the orientation and/or pose of the client device relative to such AVs, an estimated focus or target of the captured frame(s), a location within the captured frame(s) (e.g., background, foreground, center, edge, etc.) of such AVs, what portion of an AV is depicted in the captured frame(s) (e.g., the entire AV, a truncated portion, a rear portion, a front portion, a side portion, etc.), a route of each AV depicted in the captured frame(s), information about a maneuver/behavior implemented and/or planned to be implemented by each AV depicted in the captured frame(s) (e.g., is the AV stationary, moving, turning, stopping, parking, merging, etc.), and/or other information about any AVs depicted in the captured frame(s).

At block 208, the process 200 can include locating the AV depicted in the frame(s). For example, once the feedback system 164 has identified the relevant AV depicted in the frame(s), the feedback system 164 can determine a location of the relevant AV based on data collected by the AV, such as sensor data collected by the AV from one or more sensors on the AV. In some cases, the feedback system 164 can retrieve the tracked location of the identified AV to determine the location of the AV. As previously noted, each AV can be configured to collect data from various sensors during operation, which can be used to obtain a tracked location of each AV. Thus, once the feedback system 164 has identified the relevant AV depicted in the frame(s), the feedback system 164 can locate the AV based on the tracked location of that AV.

At block 210, the process 200 can include generating user feedback about the AV depicted in the frame(s). The user feedback can include any data relevant to the AV and/or a scenario encountered by the AV in a scene where/when the frame(s) was captured, data generated by the feedback system 164, data generated by the AV, data generated by one or more other AVs, data generated by the client device, data generated by the user, and/or any other data. In some cases, the user feedback may include explicit feedback provided by the user who captured the frame(s) as further described herein, which the feedback system 164 can use to form the user feedback about the AV at block 210.

In some examples, the user feedback can include, for example and without limitation, a condition, state, behavior/operation, performance, parameter, event, and/or attribute of the AV estimated at least in part on the captured frame(s). In some cases, the user feedback can additionally or alternatively include information about the AV obtained by the feedback system 164 based on one or more inputs provided by the user who captured the frame(s), such as a rating or score provided by the user regarding the AV (e.g., regarding a behavior/operation of the AV, the way the AV handled a particular situation/scenario, a performance of the AV, an attribute of the AV, a state of the AV, an error associated with the AV, an event encountered and/or handled by the AV, etc.), an assessment provided by the user (e.g., a positive or negative assessment or comment, etc.) about the AV (e.g., a like, a dislike, a review, a comment, etc.), a suggested modification to the AV and/or a behavior/operation of the AV (e.g., a different behavior or route that the user who captured the frame(s) suggests the AV should have implemented in a given scenario associated with the captured frame(s), a different state suggested by the user who captured the frame(s), an action by the AV suggested by the user who captured the frame(s), etc.), a suggested remedy to an issue reported by the user and/or associated with the frame(s) captured by the user, a recommendation about the AV from the user, and/or any other feedback from the user.

In some aspects, the feedback system 164 can generate the user feedback based on the identity of the AV, the location of the AV, the frame(s) depicting the AV, data collected by the AV, data collected by one or more other AVs in the scene, data and/or inputs from the user who captured the frame(s), user feedback from the user, etc. Moreover, in some examples, at least some of the user feedback can be estimated or inferred by the feedback system 164. For example, the feedback system 164 can estimate or infer at least a portion of the user feedback from available data such as, for example, the captured frame(s), sensor data from the AV, sensor data from one or more other AVs, metadata associated with the frame(s), log data from the AV and/or one or more other AVs, data from the client device, data from the user who captured the frame(s), and/or any other data. In some cases, the user feedback or a portion thereof can additionally or alternatively include explicit feedback provided by the user via one or more user feedback inputs. For example, the user can provide explicit feedback about the AV, which the feedback system 164 can use as the user feedback at block 210 (or use to generate the user feedback at block 210). The feedback system 164 can associate the explicit feedback from the user with the identified AV. In some cases, the feedback system 164 can also associate the explicit feedback from the user with the location of the AV determined at block 208.

As previously noted, in some cases, at least a portion of the user feedback can be estimated or inferred by the feedback system 164 from available data such as, for example, the captured frame(s), data collected by the AV, data collected by one or more other AVs, data about a context and/or scene associated with the AV, and/or any other information provided by the user who provided the frame(s). For example, the feedback system 164 can process the frame(s) to determine a condition, state, behavior/operation, performance, parameter, event, and/or attribute of the AV estimated to represent a relevant feedback provided by the user via the captured frame(s). Here, the feedback system 164 can extract features in the frame(s) and use the extracted features to determine (e.g., classify, recognize, etc.) a condition, state, behavior/operation, performance, parameter, event, and/or attribute of the AV estimated to represent relevant feedback that the user intended to report about the AV based at least in part on the captured frame(s). The feedback system 164 can include the condition, state, behavior/operation, performance, parameter, event, and/or attribute of the AV as the user feedback generated at block 210 or can use the condition, state, behavior/operation, performance, parameter, event, and/or attribute of the AV to generate the user feedback.

For example, the feedback system 164 can use the condition, state, behavior/operation, performance, parameter, event, and/or attribute of the AV to generate user feedback identifying one or more issues and/or events associated with the AV (e.g., an error, an anomaly, a malfunction, an incorrect behavior/operation, a correct behavior/operation, an incorrect or undesired state of the AV, a particular performance such as a positive or negative performance, a particular condition of the AV, etc.), an estimated cause of the one or more issues and/or events associated with the AV, an estimated solution to the estimated cause, a recommendation (e.g., a recommended action, a recommended parameter, a recommended route change, a recommended modification, a recommended behavior change, a recommended solution, a recommended functionality, a recommended hardware change, etc.), a suggested adjustment to the AV (e.g., to a software of the AV, to a hardware of the AV, to a mechanical system of the AV, to an appearance of the AV, to a behavior of the AV, to a functionality of the AV, to a route of the AV, to an output of the AV, to a system of the AV, to a capability of the AV, to a parameter of the AV, to an operation of the AV, etc.), relevant information associated with the user feedback (e.g., a location, a context, an AV maneuver or operation, a scene or type of scene, AV capabilities, an event, a scenario, a logged behavior/operation of the AV, sensor data, log data, the captured frame(s), a user input, a relevant issue or error, an AV parameter, etc.), one or more identified conditions and/or risks, and/or any other information.

In some aspects, the feedback system 164 can generate the user feedback based on the condition, state, behavior/operation, performance, event, and/or attributes of the AV determined from the captured frame(s) and any other data as described herein. In some examples, the user feedback can include a recommendation and/or a suggested modification for the AV (and any other AVs) generated by the feedback system 164 based on the determined condition, state, behavior/operation, performance, event, and/or attributes of the AV.

The feedback system 164 can associate such user feedback with the identified AV, other AVs (e.g., other AVs having the same model, capabilities, hardware, mechanical systems, and/or software as the identified AV), a relevant scene and/or context, the user who captured the frame(s), a relevant scenario, a relevant condition, an AV parameter, an AV behavior, and/or any other aspects of the AV, the scene, the context, and/or a fleet of AVs including the AV. In some cases, the feedback system 164 can also associate the user feedback with the determined location of the identified AV, and/or may use the determined location of the identified AV to determine the user feedback.

In some examples, the feedback system 164 can additionally or alternatively use data collected by the identified AV and/or other AVs in the environment to generate the user feedback. For example, the feedback system 164 can determine an issue, situation, scenario, event, and/or condition that the feedback system 164 estimates the user intends to report about the AV via the captured frame(s). The feedback system 164 can retrieve sensor data captured by the AV and/or other AVs in the area during a relevant period of time. The feedback system 164 can use such sensor data to gain further insights about the AV during the relevant period of time, which the feedback system 164 can use to generate the user feedback. In some cases, the feedback system 164 can retrieve one or more frames captured by the AV and/or other AVs in the area during the relevant period of time, and provide the one or more frames as additional context associated with the AV during the relevant period of time.

In some cases, the user feedback can include or can be generated from an input(s) from the user who captured the frame(s). For example, when the user provides a captured frame(s) depicting the AV, the feedback system 164 can solicit information from the user. To illustrate, if the user submits the captured frame(s) via a client application associated with the feedback system 164, the feedback system 164 can provide to the client device a user interface with one or more input options for presentation via the client application. The user interface can include an option for the user to input information about the AV and/or the situation, describe and/or identify what the user intends to report about the AV, identify what the user believes should be corrected with respect to the AV and/or the situation, identify how the user believes the AV should have behaved/operated in the situation, and/or any other information about the AV, the scene, the user, and/or the situation. For example, the user interface can include a map identifying a route and/or behavior of the AV where the user can provide an input (e.g., by moving interface elements such as a depicted AV or a depicted stopping line, by adding comments via the user interface, by drawing a suggested path or behavior for the AV, by manipulating elements displayed in the user interface, by describing one or more suggested adjustments that the AV should implement, by visually adjusting a behavior or operation of the AV, etc.) identifying how the user believes the AV should have behaved/operated in the relevant situation (e.g., indicating how the behavior, operation, parameter, path, and/or aspect of the AV in the relevant situation should be adjusted). The feedback system 164 can use the input provided by the user to generate the user feedback or as part of the user feedback.

As another example, the user interface can include a video (e.g., a sequence of frames) depicting an operation of the AV within a period before and/or after the time when the frame(s) was captured and/or reported. For example, if the feedback system 164 is unable to identify what the user intended to report about the AV through the captured frame(s), the feedback system 164 can provide a video depicting the AV during a relevant period of time, for presentation at the client device of the user via the user interface. The user can review the video to identify the particular behavior/operation of the AV that the user intended to report, and can provide an input identifying such behavior/operation and/or a frame(s) in the video that depicts such behavior/operation. In some examples, the video depicting the AV can include frames captured by the AV and/or one or more other AVs in the scene at a relevant time(s) associated with the situation being reported. For example, as previously noted, AVs in a fleet can continuously collect sensor data, including image data (e.g., frames), while navigating environments. Therefore, if there were other AVs in the scene around the time when the user captured and/or submitted the frame(s) depicting the AV, the feedback system 164 can retrieve frames collected by the other AVs that depict the AV being reported, a relevant context, a scene of the AV, other agents in the scene, and/or the user during a relevant period of time(s). The feedback system 164 can provide a video (e.g., a sequence of frames) from the other AVs to the client device for presentation via the user interface and/or a screenshot from one or more frames captured by the other AVs. The user can analyze the video or a screenshot to gain additional insight about the AV and the situation and/or to provide the feedback system 164 additional information about what the user intended to report using the captured frame(s).

In some cases, the feedback system 164 can provide incentives for users to report AVs when the users witness certain (or any) AV behaviors/operations, performances, states, events, and/or conditions. For example, the feedback system 164 can provide discounts, loyalty points, AV user/ service status upgrades, and/or credits to AV ridehailing and/or product delivery services to users who report AVs as described herein. As another example, the feedback system 164 can provide additional or complimentary AV services and/or service features/offerings to users who report AVs as described herein. As yet another example, the feedback system 164 can adjust a service priority assigned to a user requesting an AV service as incentive for reporting an AV as described herein.

At block 212, the process 200 can optionally determine an action(s) to take based on the user feedback. The action(s) can include responding or replying to the user, implementing the user feedback, implementing one or more adjustments (e.g., to a software of the AV, to a hardware of the AV, to a parameter of the AV, to a route in an operational design domain (ODD) which defines where the AV can or should navigate, to a mechanical system of the AV, to a rule implemented by the AV, to a planner of the AV, to a capability of the AV, to a behavior/operation of the AV, to a system of the AV, to a component of the AV such as a sensor, to a functionality of the AV, to a preference, etc.), remedying an issue or situation, triggering remote assistance to the AV, sending a command to the AV, collecting and/or providing additional information about the AV or a context of the AV, and/or any other action.

In some aspects, the feedback system 164 can reply to the user when the user reports the AV via the captured frame(s). For example, when the user submits the frame(s) depicting the AV in order to report a behavior/operation of the AV, the feedback system 164 can reply to the user with an image or a video depicting the user from the perspective of the AV (or another AV) as a way of thanking the user for their feedback. In some examples, the image or video can be retrieved from stored frames captured by the AV during the relevant period of time and/or any other AV in the scene of the AV during the relevant period of time. For example, since the AV captures frames continuously while navigating a scene, when the user provides the captured frame(s) to report the AV, the feedback system 164 can determine a timestamp associated with the captured frame(s) (and/or associated with the time when the captured frame(s) was reported) and use the timestamp to identify a stored frame(s) collected by the AV or any AV in the scene around the time of the incident (e.g., within a time window including an estimated or known time of a relevant incident). The stored frame(s) can include one or more frames that depict the user from the perspective of the AV or the other AV.

In some cases, if, to report the AV, the user posts the frame(s) depicting the AV and the frame(s) may not fully or accurately capture a context of the particular situation being reported, the feedback system 164 can reply to such post with one or more frames that provide more information about the context associated with the particular situation. For example, the feedback system 164 can retrieve one or more frames captured by the AV (and/or captured by one or more other AVs in the scene) before and/or during the particular situation, and post the retrieved one or more frames as a reply to the user's post. The one or more frames posted by the feedback system 164 can provide additional context about the particular situation. To illustrate, if the frame(s) in the user post appears to suggest, without more information, an error encountered or caused by the AV, the feedback system 164 can retrieve one or more frames captured by the AV or another AV in the scene during a relevant period of time, and provide the one or more frames in a reply to the user post. The one or more frames can provide more context about what happened before or during the apparent error. Thus, the additional context can clarify the real/accurate or more informative reasons/causes of the error (or whether the error was an error at all or a correct operation, state, and/or condition in the given situation).

In some cases, the feedback system 164 can use the captured frame(s) depicting the AV to provide commands to the AV and/or provide assistance to the AV and/or a user associated with the AV. For example, if the user is an emergency responder or a field operator/technician that needs access to the AV, the user can use the client device to capture the frame(s) depicting the AV and send the captured frame(s) to the feedback system 164 to gain access to the AV. The feedback system 164 can obtain the captured frame(s) and identify and locate the AV as previously described, and send a command to the AV configured to unlock a door of the AV to provide the user access to the AV. As another example, if the user is an emergency responder that needs the AV to move from a location of the AV to a different location, the user can similarly capture the frame(s) depicting the AV and send the frame(s) to the feedback system 164 to obtain assistance in moving the AV. The feedback system 164 can identify the AV and send the AV a command(s) configured to trigger the AV to move to the different location, or may request a remote assistance operator assistance in remotely moving the AV to the different location.

In some cases, the feedback system 164 can provide feedback from users and/or captured frames from users to a remote assistance operator(s) who can use such information to assist an AV in need of assistance. For example, if the AV is stuck in an intersection (e.g., stopped and unable to autonomously continue through the intersection) and the frame(s) captured by the user depicts the AV stuck in the intersection, and the user can send the frame(s) to the feedback system 164 (or post the frame(s) to a site) to trigger remote assistance to the AV. The feedback system 164 can use the captured frame(s) and any other information determined by the feedback system 164 based on the user's reporting of the captured frame(s) to trigger remote assistance to the AV and/or provide such information to a remote assistance operator assigned to provide assistance to the AV. For example, the feedback system 164 can use the captured frame(s) to determine that the AV is in the stuck state and trigger remote assistance to the AV and/or provide relevant information to a remote assistance operator available to provide assistance to the AV. The information can be used to assist the AV in recovering from the stuck state (e.g., to proceed through the intersection when possible).

Figure 3:
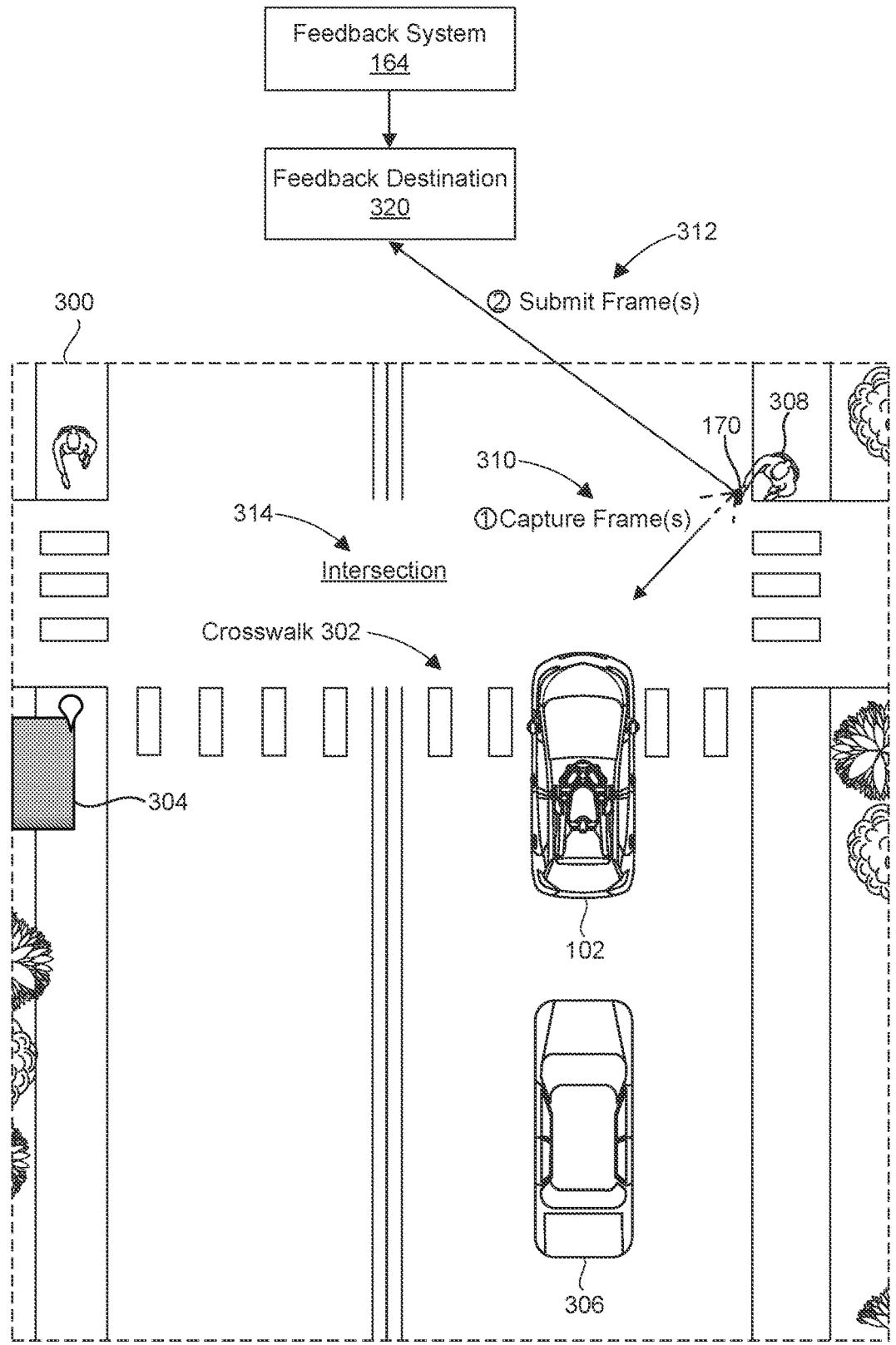
FIG. 3 is a diagram illustrating an example of a user capturing a frame depicting an autonomous vehicle in a scene and reporting the autonomous vehicle using the captured frame, according to some examples of the present disclosure.

FIG. 3 is a diagram illustrating an example of a user 302 capturing a frame(s) depicting the AV 102 in a scene 300 and reporting the AV 102 using the captured frame(s), according to some examples of the present disclosure. Here, the scene 300 includes a crosswalk 302, the AV 102, a landmark 304, a vehicle 306 trailing the AV 102, and a user 308 that has encountered the AV 102 in the scene 300. As shown, in this example, the AV 102 has stopped as it approached the crosswalk 302 but did not completely stop before the crosswalk 302. Instead, the AV 102 at least partially crossed a portion of the crosswalk 302 before reaching a stopped state. The user 308 has seen that the AV 102 did not reach a complete stop before the crosswalk 302, and intends to report the failure by the AV 102 to completely stop before the crosswalk 302.

As shown, the user 308 can use the client computing device 170 to capture 310 a frame(s) depicting the AV 102 in the scene 300. The frame(s) in this example can depict the AV 102 at least partially crossed into the crosswalk 302 before reaching a complete stop. Thus, in this example, the frame(s) depicts an issue with a behavior of the AV 102, and thus can be used to determine the issue with the behavior of the AV 102 and optionally generate feedback regarding the issue. After capturing the frame(s), the user can use the client computing device 170 to submit 312 the frame(s) to a feedback destination 320 in order to report the AV 102.

In some cases, the feedback destination 320 can include the feedback system 164 illustrated in FIG. 1. In other cases, the feedback destination 320 can include a destination where the user 308 can post or upload the frame(s) and the feedback system 164 can retrieve the frame(s) to gain insights about the AV 102 in the scene 300 and/or generate feedback about the AV 102 in the scene 300. Such destinations can include, for example and without limitation, a social media network, a blog, a website, an upload destination, a communications and/or social platform, a remote system, a storage system, a database, a feedback store, and/or any other remote device or destination.

Once the user 308 has submitted the frame(s) via the client computing device 170, the feedback system 164 can obtain the frame(s) submitted by the user 308 from the feedback destination 320. For example, if the feedback destination 320 is the feedback system 164 or part of the feedback system 164, the feedback system 164 can receive the frame(s) from the client computing device 170 of the user 308. If the feedback destination 320 is a separate system/destination such as a social media network where the user 308 posted the frame(s), the feedback system 164 can retrieve the frame(s) from the post of the user 308 in the social media network. In some cases, the feedback system 164 can identify the post on the social media network based on a tag included in or associated with the post, such as a tag identifying an entity associated with the AV 102 or a tag used to identify posts with user feedback about the AV 102 (and/or other AVs associated with the feedback system 164). As another example, if the feedback destination 320 is a blog or website where the user 308 posted or uploaded the frame(s), the feedback system 164 can retrieve the frame(s) from the blog or website.

The feedback system 164 can process the frame(s) to detect and identify the AV 102 depicted in the frame(s), as previously described with respect to block 206 of FIG. 2. For example, the feedback system 164 can extract one or more features in the frame(s) corresponding to the AV 102 depicted in the frame(s), and use the extracted features to detect one or more characteristics of the AV 102 in the frame(s). The feedback system 164 can use the detected characteristics of the AV 102 to identify the AV 102 as the AV being reported via the frame(s). In some cases, if the AV 102 cannot be identified with sufficient accuracy or certainty from the frame(s), the feedback system 164 can use other information to help the feedback system 164 identify the AV 102 depicted in the frame(s). For example, if the landmark 304 in the scene (or a portion thereof) is also depicted in the frame(s) (e.g., is within a FOV of the camera device of the local computing device 170 when the camera device of the local computing device 170 captured the frame(s)), the feedback system 164 can try to detect and identify the landmark 304 based on the frame(s) in order to determine a location of the landmark 304 that the feedback system 164 can use to identify the AV 102 in the frame(s). To illustrate, the feedback system 164 can extract features in the frame(s)

corresponding to the landmark 304, and use the extracted features to detect and identify the landmark 304 in the scene 300 (and at least partially depicted in the frame(s)).

Once the feedback system 164 has identified the landmark 304, the feedback system 164 may be able to determine a location of the landmark 304. For example, if the landmark 304 is at least partially depicted in the frame(s) and the feedback system 164 identifies the landmark 304 in the frame(s) as being an iconic post office in the area, the feedback system 164 can determine the location of the iconic post office and associate the landmark 304 with the determined location of the iconic post office. In some cases, the feedback system 164 can search for the location of the landmark 304 from a map, the Internet, a website associated with the landmark 304, a map application, a listing of recorded location information (e.g., addresses) including a location of the landmark 304, data from sensors of other vehicles in the scene 300 (or that have navigated the scene 300), or any other source. Once the feedback system 164 identifies the landmark 304 and determines the location of the landmark 304, the feedback system 164 can compare the tracked locations of one or more AVs associated with the feedback system 164 (including the AV 102) with the location of the landmark 304 to identify any AVs that are located (or were previously located at a relevant time when the frame(s) was captured and/or submitted) within a threshold proximity to the landmark 304.

If the AV 102 is within the threshold proximity to the landmark 304, the feedback system 164 may determine that the AV depicted in the frame(s) is the AV 102 located within the threshold proximity to the landmark 304. If there are multiple AVs located within the threshold proximity to the landmark 304, the feedback system 164 can identify such AVs as candidate AVs to further analyze to determine which of such AVs is the AV depicted in the frame(s). Here, the feedback system 164 can compare the tracked locations (and associated timestamps) of the multiple AVs with the location of the landmark 304 to determine which AV was located closest to the location of the AV depicted in the frame(s) at the time when the frame(s) was captured. The feedback system 164 may determine that the AV closest to the location of the AV as depicted in the frame(s) is the AV depicted in the frame(s). If the feedback system 164 is unable to determine with sufficient confidence which of the multiple AVs may be the AV depicted in the frame(s) from the proximity information, the feedback system 164 can compare features of the AV depicted in the frame(s) that the feedback system 164 can extract from the frame(s), with features of the multiple AVs that where within the threshold proximity to the landmark 304 when the frame(s) was captured.

The feedback system 164 may be able to identify with sufficient confidence a particular AV as the AV depicted in the frame(s) based on the proximity of such AV to the landmark 304 when the frame(s) was captured and any extracted features of the AV in the frame(s). If the feedback system 164 is still not able to identify with sufficient confidence a particular AV as the AV depicted in the frame(s) based on the proximity of candidate AVs to the landmark 304 when the frame(s) was captured and any extracted features of the AV in the frame(s), the feedback system 164 can use additional information to identify the particular AV that is depicted in the frame(s). For example, the feedback system 164 can analyze image data collected by sensors of one or more candidate AVs to try to reconstruct the scene 300 (or a portion thereof) at the time when the frame(s) was captured, and use the reconstructed scene to identify the particular AV depicted in the frame(s).

As another example, the feedback system 164 can analyze image data collected by sensors of one or more candidate AVs to try to find another frame(s) that depicts, at a relevant time (e.g., when the user 308 captured and/or submitted the frame(s)), the user 308 and/or the same AV as the AV depicted in the frame(s) captured by the user 308 at a relevant time (e.g., when the user 308 captured and/or submitted the frame(s)). The other frame(s) that depicts, at the relevant time, the user 308 and/or the same AV as the AV depicted in the frame(s) captured by the user 308 may provide additional information that the feedback system 164 can use to identify the correct AV that is depicted in the frame(s). For example, the feedback system 164 may be able to extract, from the other frame(s) that depicts the user 308 and/or the same AV as the AV depicted in the frame(s) captured by the user 308, features corresponding to the AV 102 depicted in the frame(s) captured by the user 308, which the feedback system 164 can use to identify one or more characteristics of the AV 102 depicted in the frame(s). The one or more characteristics can include any characteristics of the AV that can be used to identify the AV from other AVs. For example, the one or more characteristics can include visual attributes of the AV that uniquely identify the AV relative to other candidate AVs. The feedback system 164 may thus use the one or more characteristics determined from the other frame(s) (in addition to any characteristics determined from the frame(s) captured by the user 308) to identify the AV 102 depicted in the frame(s).

In some cases, the feedback system 164 can also use the tracked locations of any candidate AVs to determine (and/or to verify) which AV from the candidate AVs is most likely the AV located where the AV 102 was located when the frame(s) was captured (and/or where the AV 102 is located within the scene 300 as depicted in the frame(s) captured by the user 308). For example, the feedback system 164 can use any additional location information that the feedback system 164 obtains from the other frame(s) used to assist in identifying the AV depicted in the frame(s) captured by the user 308 and/or from the vehicle that captured the other frame(s), to help the feedback system 164 identify, from the candidate AVs (e.g., the AVs previously determined to have been within a proximity to the user 308 when the user 308 captured and/or submitted the frame(s)), which AV is the AV depicted in the frame(s).

To illustrate, the feedback system 164 can use such additional location information to verify and/or determine (or determine with greater specificity or confidence relative to a specificity or confidence of a location of the AV previously estimated from the frame(s), metadata of the frame(s), and/or the client computing device 170 that captured the frame(s)) the location of the AV depicted in the frame(s) at the time that the frame(s) was captured and/or submitted (or within a time window that includes the time when the frame(s) was captured and/or submitted). The feedback system 164 can compare such location information with the tracked locations of any candidate AVs within the scene 300 (and/or within a proximity to the scene 300) at the time that the frame(s) was captured and/or submitted, to determine which AV is most likely to have been located where the AV depicted in the frame(s) was located at the time that the frame(s) was captured. The feedback system 164 can then identify the AV 102 depicted in the frame(s) based on a determination that the AV 102 is the AV from the candidate AVs that was located where the AV depicted in the frame(s) was located when the frame(s) was captured or that the AV 102 is the AV from the candidate AVs that is most likely to have been located where the AV depicted in the frame(s) was located when the frame(s) was/were captured.

In some cases, the feedback system 164 can determine the orientation or heading of the AV 102 as depicted in the frame(s), which represents or corresponds to the orientation or heading of the AV 102 depicted in the frame(s) relative to the client computing device 170 that captured the frame(s) at the time when the frame(s) was/were captured, and use the orientation or heading to help the feedback system 164 identify which AV from the candidate AVs is the AV depicted in the frame(s).

For example, if the orientation or heading of the AV 102 as depicted in the frame(s) captured by the user 308 (and/or as depicted in the other frame(s) captured by one or more AV candidates in the scene 300 as described in a previous example) indicates that the AV 102 was traveling northbound when the frame(s) was captured and the feedback system 164 narrows the list of candidate AVs based on tracked locations to a first AV that was in the scene 300 traveling southbound when the frame(s) was/were captured and a second AV (e.g., AV 102) that was in the scene 300 traveling northbound when the frame(s) was/were captured, the feedback system 164 can determine that the second AV (e.g., the AV 102) is the AV depicted in the frame(s). The feedback system 164 can identify the second AV (e.g., AV 102) as the AV depicted in the frame(s) based on a tracked location of the second AV at the time when the frame(s) was/were captured, a determination that the first AV was traveling southbound in the scene 300 when the frame(s) was/were captured, which is inconsistent with the orientation and/or heading of the AV 102 depicted in the frame(s), and/or a determination that the second AV was traveling northbound in the scene 300 when the frame(s) was/were captured, which is consistent with the orientation or heading of the AV 102 depicted in the frame(s).

In some cases, the feedback system 164 can extract from the frame(s) additional information about the AV 102 depicted in the frame(s), which the feedback system 164 can use to help identify the AV 102 depicted in the frame(s). For example, the feedback system 164 can analyze the frame(s) and detect from the frame(s) that the AV 102 is depicted in the frame(s) as having a high-beam light system turned on at the time when the frame(s) was/were captured. The feedback system 164 can review logged data from candidate AVs (e.g., AVs identified as being within the scene 300 (or within a proximity to the scene 300) and/or within a proximity to the client computing device 170 when the frame(s) was/were captured by the client computing device 170) and determine based on the logged data that the AV 102 had a high-beam light system turned on at the time when the frame(s) was/were captured. The feedback system 164 can analyze the logged data of the other AVs from the candidate AVs to determine if any of the other candidate AVs had their high-beam light system turned on at the relevant time. If the AV 102 was the only candidate AV that had its high-beam light system turned on at the relevant time, the feedback system 164 can determine that the AV 102 is the AV depicted in the frame(s). In this way, the feedback system 164 can identify the AV 102 as the AV depicted in the frame(s).

As another example, the feedback system 164 can analyze the frame(s) and detect from the frame(s) that the AV 102 is depicted in the frame(s) as having its emergency lights turned on at the time when the frame(s) was/were captured. The feedback system 164 can review logged data from candidate AVs (e.g., AVs identified as being within the scene 300 (or within a threshold proximity to the scene 300) and/or within a threshold proximity to the client computing device 170 when the frame(s) was/were captured by the client computing device 170), and determine from the logged data that the AV 102 had its emergency lights turned on at the time when the frame(s) was/were captured. The feedback system 164 can analyze the logged data of the other AVs from the candidate AVs to determine if any of the other candidate AVs had their emergency lights turned on at the relevant time. If the AV 102 was the only AV from the candidate AVs that had its emergency lights turned on at the relevant time, the feedback system 164 can determine that the AV 102 is the AV depicted in the frame(s). In this way, the feedback system 164 can identify the AV 102 as the AV depicted in the frame(s).

As yet another example, if the frame(s) include a video (e.g., a sequence of video frames), the feedback system 164 can analyze the video and detect from the video a sound emitted by the AV 102 that indicates that the AV 102 activated its horn during the video (e.g., at the time when the video was captured). The feedback system 164 can review logged data from candidate AVs (e.g., AVs identified as being within the scene 300 (or within a threshold proximity to the scene 300) and/or within a threshold proximity to the client computing device 170 when the video was captured by the client computing device 170), and determine from the logged data that the AV 102 had activated its horn at the time when the video was captured. The feedback system 164 can analyze the logged data of the other AVs from the candidate AVs to determine if any of the other candidate AVs had their horns activated at the relevant time. If the AV 102 was the only AV from the candidate AVs that had its horn activated at the relevant time, the feedback system 164 can determine that the AV 102 is the AV depicted in the video. In this way, the feedback system 164 can identify the AV 102 as the AV depicted in the video.

As yet another example, if the frame(s) include a video, the feedback system 164 can analyze the video and detect from the video that the AV 102 depicted in the video performed a particular maneuver (e.g., prior to stopping) at a time when the video was being captured (e.g., the AV 102 is depicted in the video as performing the particular maneuver). The feedback system 164 can review logged data from candidate AVs (e.g., AVs identified as being within the scene 300 (or within a threshold proximity to the scene 300) and/or within a threshold proximity to the client computing device 170 when the video was captured by the client computing device 170), and determine from the logged data that the AV 102 performed that particular maneuver at the time when the video was captured. The feedback system 164 can analyze the logged data of the other AVs from the candidate AVs to determine if any of the other candidate AVs also performed the particular maneuver at the relevant time or within a relevant time window. If the AV 102 was the only AV from the candidate AVs that performed the particular maneuver at the relevant time or within the relevant time window, the feedback system 164 can determine that the AV 102 is the AV depicted in the video. In this way, the feedback system 164 can identify the AV 102 as the AV depicted in the video.

As previously explained, in some cases, the feedback system 164 can use other information to help the feedback system 164 identify the AV 102 depicted in the frame(s). For example, in some cases, the feedback system 164 can use information about the client computing device 170 corresponding to a relevant time (e.g., a time or time window when the frame(s) was captured and/or submitted), such as a location, orientation, pose (e.g., orientation and position), pointing direction of a camera sensor of the client computing device 170 (e.g., relative to the scene 300 and/or anything in the scene 300), and/or motion of the client computing device 170 when the frame(s) was/were captured and/or submitted (or a time window that includes the time when the frame(s) was/were captured and/or submitted), to help the feedback system 164 identify the AV 102 depicted in the frame(s). To illustrate, if the frame(s) depicts multiple vehicles (e.g., the AV 102 and at least a portion of one or more other vehicles), the feedback system 164 can use information about the location, orientation, pose, pointing direction, and/or motion of the client computing device 170 to determine (e.g., to disambiguate or narrow) which of the multiple vehicles is the AV depicted in the frame(s) that the user 308 is believed to have intended to report when the user 308 submitted the frame(s).

For example, the feedback system 164 can determine the location, orientation, pose, and/or motion of each vehicle depicted in the frame(s) relative to the client computing device 170 based on the depiction of each vehicle in the frame(s) and the location, orientation, pose, pointing direction, and/or motion of the client computing device 170. In some cases, the feedback system 164 can analyze the frame(s) to determine an estimated location, orientation, pose, and/or motion of each vehicle relative to the client computing device 170 as reflected in the frame(s) and/or the pointing direction of the camera sensor of the client computing device 170 when the frame(s) was/were captured. The feedback system 164 can use a location, orientation, pose, and/or motion of the client computing device 170 when the frame(s) was/were captured and/or the pointing direction of the camera sensor of the client computing device 170 when the frame(s) was/were captured, as well as a depiction of each vehicle in the frame(s), to determine a location, orientation, pose, and/or motion of each vehicle at the time (or within a time window) when the frame(s) was/were captured. The feedback system 164 can review logged data from one or more AVs (e.g., all AVs in a fleet, any AVs identified as being in the scene when the frame(s) was/were captured, any AVs determined to be within a threshold proximity to the client computing device 170 when the frame(s) was/were captured, etc.), such as a set of candidate AVs, to determine the locations, orientations, poses, and/or motion of such AVs at a relevant time (e.g., the time when the frame(s) was/were captured and/or submitted or a window of time including the time when the frame(s) was/were captured and/or submitted).

The feedback system 164 can compare the determined locations, orientations, poses, and/or motion of such AVs to the location, orientation, pose, and/or motion determined for each vehicle depicted in the frame(s) to identify which AVs are the AVs depicted in the frame(s). The feedback system 164 can identify such AVs based on a match, similarity metric, or distance metric between the logged locations, orientations, poses, and/or motion of such AVs and the location, orientation, pose, and/or motion of each vehicle as reflected in the frame(s). In some cases, the feedback system 164 can further identify which of the multiple AVs depicted in the frame(s) is the AV that the user 308 is believed to have intended to report when the user 308 submitted the frame(s). For example, the feedback system 164 can analyze the frame(s) to make determinations about the AVs depicted in the frame(s) that the feedback system 164 can use to identify the particular AV being reported through the frame(s). To illustrate, the feedback system 164 can determine which AV depicted in the frame(s) is likely the AV being reported based on how each AV is depicted in the frame(s).

For example, the feedback system 164 can determine which AV/AVs are in a background or foreground region of the frame(s), which AV/AVs (if any) are at least partially occluded in the frame(s), which AV/AVs (if any) are centered in the frame(s) (or are most centered within the frame(s)), which AV/AVs (if any) appear to be most prominently depicted in the frame(s), which AV/AVs (if any) are fully contained within the frame(s) or partially truncated in the depiction in the frame(s), which AV/AVs (if any) the camera sensor of the client computing device 170 appears to be pointed at when the frame(s) was/were captured (e.g., as estimated from the location, orientation, and/or pose of each AV in the frame(s) and/or a respective view/depiction of each AV in the frame(s)), and/or any other relevant information determined from the frame(s). The feedback system 164 can estimate which AV from the multiple AVs depicted in the frame(s) the user 308 intended to report based on such information. For example, the feedback system 164 can estimate that the AV that the user 308 intended to report by submitting the frame(s) is the AV that is in the foreground of the frame(s), is centered within the frame(s), is not (or is least) truncated within the frame(s), appears closest to the client computing device 170, and/or appears most prominent in the frame(s).

In some cases, some of the information used by the feedback system 164 to identify (and/or locate) the AV depicted in the frame(s) and believed to be the AV being reported by the user 308, can include information obtained by the feedback system 164 from metadata of the frame(s) and/or a client application (e.g., ridehailing application 172) used by the user 308 to submit the frame(s). For example, in some cases, the frame(s) can include metadata identifying a location, heading, and/or orientation of the client computing device 170 when the frame(s) was/were captured, any motion of the client computing device 170 when the frame(s) was/were captured, a direction in which a camera sensor of the client computing device 170 was pointed when the frame(s) was/were captured, etc., which the feedback system 164 can use to assist in identifying and/or locating the AV 102 depicted in the frame(s). As another example, if the user 308 uses a certain client application to submit the frame(s), such as the ridehailing application 172, the application can provide to the feedback system 164 information about the location, orientation, pose, motion, etc., of the client computing device 170 and/or the direction in which the camera sensor of the client computing device 170 was pointed when the frame(s) was/were captured. In some examples, such information can be obtained by the client computing device 170 from one or more sensors of the client computing device 170 such as, for example and without limitation, a camera sensor (e.g., used to collect image data), a gyroscope (e.g., used to collect an orientation or angular velocity), an accelerometer (e.g., used to collect acceleration measurements), an IMU (e.g., used to collect motion information), a microphone (e.g., used to record audio), and/or any other sensor.

In some aspects, the feedback system 164 can provide incentives for users to report AVs when the users witness certain (or any) behaviors/operations, performances, states, events, and/or conditions associated with AVs. For example, the feedback system 164 can provide discounts, loyalty points, AV user account upgrades, AV service upgrades, AV account and/or service subscription upgrades and/or benefits, credits to AV services to users who report AVs such as AV ridehailing and/or product delivery services, rewards, deals, user trust upgrades and/or increases, extra AV and/or service features, extra AV services, access to additional or paid (e.g., premium) features and/or services (e.g., access to content (and/or upgraded content) from display devices in the cabin/interior (e.g., cabin system 138) of AVs, access to extra features or modules of an AV client application such as ridehailing application 172, access to games available on or through a device in the cabin/interior of AVs, upgraded access to (or access to extra) maps, map features, and/or AV content (e.g., trip information, service information, trip/service status information, AV information, etc.), access to wireless networks hosted by AVs and accessible within the AVs, reduced or eliminated AV service and/or occupancy restrictions, vehicle upgrades when requesting an AV for a ride or service, options to have user-selected promotional content (e.g., advertising content) presented on an exterior and/or interior/cabin of one or more AVs (e.g., on a sign or sticker on an AV(s), on a painted surface of the AV, on a display device on an exterior of the AV, on a display device on an interior/cabin of the AV, etc.) for viewing by one or more users (e.g., the user who selected such content, other users, the public, etc.), upgraded or extended AV service coverage, images or videos depicting the users from the perspective of an AV, content associated with an AV service experience (e.g., an image, video, and/or recording generated by an AV while transporting a user, statistics about the trip of a user who used an AV, sensor data and/or logged data from an AV during a trip with the AV, etc.), and/or any other incentives.

As another example, the feedback system 164 can provide additional or complimentary AV services and/or service features/offerings to users who report AVs as described herein. As yet another example, the feedback system 164 can adjust a service priority assigned to a user requesting an AV service as incentive for reporting AVs as described herein. To illustrate, when a user requests a ride or delivery service from an AV, the AV can assign a priority to the user relative to other users who also requested rides or delivery services from the AV (and/or any other AV in the fleet). If the user has previously reported an AV as described herein, the user can receive a prioritization benefit as a reward/incentive for having reported an AV, where the priority assigned to the user is increased (e.g., the user is given a higher priority) in order to reduce the amount of time the user has to wait to be picked up by the AV for the requested ride or to receive a delivery service requested.

In some aspects, the feedback system 164 can reply to users when the users report an AV via a captured frame. For example, when the user 308 submits the frame(s) depicting the AV 102 in order to report a behavior/operation of the AV 102, the feedback system 164 can reply with an image or video depicting the user 308 from the perspective of the AV 102 (and/or another AV) as a way of thanking the user 308 for their feedback. In some examples, the image or video can be retrieved from stored frames captured by the AV 102 and/or other AVs during a relevant period of time. For example, since the AV 102 captures frames continuously while navigating, when the user 308 provides the frame(s) to the feedback destination 320 to report the AV 102, the feedback system 164 can determine a timestamp associated with the frame(s) (and/or associated with the time when the frame(s) was reported) and use the timestamp to identify a stored frame(s) collected by the AV 102 or another AV in the scene 300 around the time when the frame(s) was captured or submitted. The stored frame(s) can include an image, video, or screenshot generated by the AV 102 or another AV, that depicts the user 308 from the perspective of the AV 102 or the other AV. The stored frame(s) can be provided to the user 308 to thank the user 308 for reporting the AV 102 and participating in the reporting of AVs.

In some cases, when a user reports an AV in a situation or publicly shares a frame(s) depicting the AV in a situation, if the reported or publicly shared information is missing context information that may affect how the situation is viewed and/or interpreted by the user and/or other users, the feedback system 164 can supplement the information provided by the user with an image, video, or screenshot generated by one or more AVs in the area, which can provide additional context regarding the situation and/or the AV. For example, if the user 308 posts an image or video of the AV 102 in a particular situation and the image or video does not fully or accurately capture a context of the particular situation, the feedback system 164 can reply to the post from the user 308 and include one or more frames captured by the AV 102 or another AV(s) in the scene 300. The one or more frames can provide more information about the context associated with the particular situation, which can be used by users viewing the one or more frames to gain a further and/or more accurate understanding of the particular situation and the context associated with the particular situation.

For example, assume the user 308 posted the frame(s) in the feedback destination 320 and the frame(s), without more context, presents the AV 102 in a negative way, suggests or indicates something negative about the AV 102 and/or a behavior of the AV 102, or shows the AV 102 in a way that may create (or suggest) a negative perception about the AV 102 to those who view the frame(s) (e.g., shows the AV 102 behaving improperly or anomalously without more context). In this example, the feedback system 164 can process the frame(s) to extract information from the frame(s), such as information about the AV 102, the scene 300, a situation involving the AV 102, a behavior of the AV 102, one or more items (e.g., objects, devices, pedestrians, animals, vehicles, structures, buildings, scene elements, etc.) depicted in the frame(s), etc., and use the extracted information to determine a situation, condition, state, event, behavior/operation, error, setting, sentiment, and/or detail reflected in the posted frame(s). For example, the feedback system 164 can use the extracted information to determine that the frame(s) is missing context, depicts the AV 102 in a negative way, provides incomplete information about the situation involving the AV 102, may be misinterpreted/misunderstood, and/or may reflect or convey/portray inaccurate or incomplete information about the AV 102.

To provide the user 308 and any other users who view the post/frame(s) more information that can clarify or correct anything about the situation involving the AV 102 depicted in and/or conveyed through the frame(s), the feedback system 164 can obtain additional content, such as one or more frames (e.g., one or more still images and/or video frames) that the feedback system 164 can use to provide (e.g., to the user 308 and/or in a reply to the post of the frame(s)) additional information that may clarify and/or correct anything about the situation associated with the AV 102 and the frame(s) and/or provide context information that is missing from the posted frame(s) and/or more complete than the posted frame(s). The feedback system 164 can obtain or generate the additional content from data collected, stored, and/or generated by the AV 102 (e.g., sensor data collected by the AV 102, logging data generated by the AV 102, etc.) and/or one or more other vehicles, such as other AVs in a fleet and/or any AVs located within the scene 300 and/or within a threshold proximity to the scene 300 at a relevant time or period of time (e.g. when the frame(s) was captured and/or posted), and/or data inputs from one or more users. The additional content can include audio content, image data, and/or other content. In some examples, the additional content can include one or more frames, such as one or more still images or a sequence of frames that together make a video. The one or more frames can differ from the posted frame(s) in one or more ways.

For example, the one or more frames can depict a different portion(s) of the scene 300 and/or the AV 102 that is/are not depicted in the posted frame(s); can depict the AV 102 and/or a portion of the scene 300 at one or more different and/or additional times than the time(s) when the posted frame(s) was/were captured such as a time (or period of time) before the situation associated with the posted frame(s) occurred or was encountered by the AV 102 and/or the user 308, a time (or period of time) during the situation, and/or a time (or period of time) after the situation; can provide different and/or additional content and/or type of content than the posted frame(s) (e.g., audio and/or video recorded in the scene 300 that is relevant to the situation and is not included in the posted frame(s), a more complete and/or higher-quality version of audio and/or video content included in the posted frame(s), a screenshot or still picture, weather information, scene information, lighting information, context information, etc.); can depict and/or record one or more aspects of a relevant situation (e.g., the AV 102, another vehicle, a bicycle, a motorcycle, a train, a scooter, a pedestrian, a road user, an animal, an object on the road, an obstacle on the road, a condition in the road and/or the environment, a traffic cone, a traffic signal, a human traffic controller, an emergency responder, a weather condition, activity in the scene 300, other actions and/or physical things involved in the situation, etc.) from a different perspective and/or setting or configuration than the posted frame(s) (e.g., from a different angle, position, height, and/or distance; from a different resolution; from a different view; from a view or perspective that eliminates or reduces an obstacle, occlusion, or obstruction that hides, occludes, obstructs, or obfuscates something in the scene 300; etc.); etc.

As another example, the one or more frames can depict and/or record one or more aspects of a relevant situation from a different configuration (e.g., a different resolution, a different frame rate, a different aspect ratio, a different format (e.g., an audio format, a video format, an image format, a landscape format, a portrait format, a panoramic format, a cinematic format, etc.), a different magnification, a different pre-processing and/or post-processing, etc.); can have different effects (e.g., image stabilization, cropping, image sharpening, image restoration, image enhancement, noise reduction, geometric correction, scaling, smoothing, color or contrast enhancement, audio enhancement, compositing, grayscale conversion, filtering, deblurring, demosaicking, color balancing, compression, lens distortion correction, black level adjustment, faulty pixel replacement, exposure control, white or color balance, edge enhancement, color correction, color saturation enhancement, gamma correction, debayering, denoising, stylization, etc.); from a different device, type of device, and/or configuration (e.g., from a different type of camera sensor; from a different type of microphone; from a camera sensor having or using a different FOV, focus, depth of field, hardware, setting, and/or parameter; etc.); from a number of different sources (e.g., different microphones and/or camera sensors on the AV 102 and/or one or more other AVs); etc. As previously noted, in some cases, the one or more frames collected and/or generated by the feedback system 164 can provide additional context about the particular situation.

In some cases, the feedback system 164 can use the frame(s) depicting the AV 102 to provide remote commands to the AV 102, provide remote assistance to the AV 102, and/or provide assistance to a user associated with the AV. For example, if the user 308 is an emergency responder or a field operator/technician that needs access to the AV 102, the user 308 can use the client computing device 170 to capture the frame(s) depicting the AV 102 and send the frame(s) to the feedback system 164 for help accessing the AV 102. The feedback system 164 can use the frame(s) to identify and locate the AV 102 as previously described. Once the feedback system 164 has identified the AV 102 using the frame(s), the feedback system 164 can generate and send a command to the AV 102 configured to grant the user 308 access to the AV 102. For example, the command can unlock a door of the AV 102 to provide the user 308 access to the AV 102. As another example, if the user 308 is an emergency responder that needs the AV 102 to move from a location of the AV 102 to a different location, the user 308 can similarly send the frame(s) depicting the AV 102 to the feedback system 164. The feedback system 164 can use the frame(s) to identify the AV 102 as described herein, and can generate and send the AV 102 a command(s) configured to trigger the AV 102 to move to the different location.

In some examples, the feedback system 164 can use the frame(s) to help the AV 102 recover from a particular error event. For example, the feedback system 164 can determine that the AV 102 is stuck at the intersection 314 based on the frame(s) and generate a command configured to remotely trigger the AV 102 to recover from the stuck event by moving through the intersection 314 or parking on a side of the road.

In some cases, the feedback system 164 can provide the frame(s) submitted by the user 308 and/or user feedback generated by the feedback system 164 as previously explained, to a remote assistance operator(s) who can use such information to assist an AV in need of assistance, such as the AV 102 depicted in the frame(s). For example, if the AV 102 is stuck in the intersection 314 (e.g., stopped and unable to autonomously continue through the intersection 314) and the user 308 captures and submits the frame(s) depicting the AV 102 stuck at the intersection 314, the feedback system 164 can use the frame(s) and any information determined by the feedback system 164 based on the frame(s), an input(s) from the user 308, data from the AV 102, and/or data from other AVs to request and/or trigger remote assistance for the AV 102. The feedback system 164 can provide any of such information to a remote assistance operator that is involved in and/or assigned to the requested or triggered remote assistance session associated with the AV 102 in order to provide assistance to the AV 102. The information can assist the remote assistance operator to determine what happened to the AV 102, understand the scene 300 and/or situation associated with the AV 102, and determine how to assist the AV 102 to recover from the stuck state (e.g., to proceed through the intersection 314 when possible).

In some aspects, when the user 308 submits the frame(s) depicting the AV 102, the feedback system 164 can solicit information from the user 308. For example, if the user 308 submits the frame(s) via a client application (e.g., ridehailing application 172) associated with the feedback system 164, the feedback system 164 can provide to the client computing device 170 of the user a user interface with one or more input options for presentation to the user via the client application. The user interface can solicit information from the user 308 and/or can include one or more options for the user 308 to input information about the AV 102, the scene 300, and/or the situation, describe and/or identify what the user 308 intends to report about the AV 102 (e.g., describe the situation being reported, an error and/or failure associated with the AV 102, a behavior/operation of the AV 102, a performance of the AV 102, an anomaly (or anomalous behavior) and/or unexpected/undesired behavior of the AV 102, a condition and/or state of the AV 102, an event associated with the situation being reported regarding the AV 102, information about any other agent or anything else in the scene (e.g., other vehicles such as vehicle 306, pedestrians in the scene 300, animals in the scene 300, other road users in the scene 300, obstacles in the scene 300, objects in the scene 300, hazard in the scene 300, etc.), information about the scene 300 and/or the relevant situation (e.g., information about traffic signals and/or conditions in the scene 300, weather and/or environment conditions in the scene 300, risk factors associated with the situation, etc.), an indication of what the user 308 believes should be corrected with respect to the AV 102 and/or the situation, an indication of how the user 308 believes the AV 102 should have behaved/operated, and/or any other information about the AV 102, the scene 300, the user 308, and/or the situation.

For example, the user interface can include a map identifying a route and/or behavior of the AV 102 where the user 308 can provide an input identifying how the user 308 believes the AV 102 should have behaved/operated in the relevant situation (e.g., indicating how the behavior/operation of the AV 102 in the relevant situation should be adjusted), feedback about a behavior/operation and/or performance of the AV 102, a location where the user 308 believes the AV 102 performed a maneuver being reported by the user 308, a path that the user 308 believes the AV 102 should have followed/traversed, a behavior that the AV 102 should have implemented, a suggested adjustment to a parameter and/or behavior of the AV 102, and/or any other information. In some examples, the user 308 can provide the input by moving or modifying an element(s) in the user interface such as an element representing the AV 102; by moving, modifying, removing, or adding a visual element (e.g., a line) representing a location in the scene 300 where the AV 102 stopped or should have stopped, by adding or modifying a depiction of a path that the AV 102 traversed or the user 308 believes the AV 102 should have traversed, by drawing or marking a path that the user 308 believes the AV 102 should have followed/traversed, by drawing or marking a path that the user 308 believes was incorrectly traversed by the AV 102, by adding or modifying an interface element representing an object, vehicle, obstacle, condition, or event that the user 308 believes to be a cause of an action of the AV 102 being reported by the user 308, by adding comments providing information about the situation (e.g., about the AV 102, the scene 300, an event, an operation, etc.), by reconfiguring one or more aspects of the scene 300 depicted in the user interface, by flagging one or more features of the scene 300 that may be relevant to the situation being reported, and/or by providing any other inputs.

As another example, the user interface can include a video (e.g., a sequence of video frames) depicting an operation of the AV 102 within a time or period before and/or after the time when the frame(s) was captured and/or submitted. To illustrate, if the feedback system 164 is unable to identify what the user 308 intended to report about the AV 102 using the frame(s), the feedback system 164 can provide to the client computing device 170 of the user 308 a video depicting the AV 102 during a relevant period of time, for presentation at the client computing device 170 (e.g., via the user interface). The user can review the video to identify the particular situation and/or the particular behavior/operation of the AV 102 that the user intended to report, and can provide (e.g., via the user interface) an input(s) identifying the particular situation and/or behavior/operation of the AV 102, and/or identifying a frame(s) in the video that depicts the particular situation and/or behavior/operation of the AV 102.

In some examples, the video depicting the AV can include frames captured by the AV 102 and/or one or more other AVs in the scene 300 at the relevant time(s). For example, AVs can continuously collect sensor data, including image data (e.g., frames), while navigating environments. Therefore, if there were other AVs in the scene 300 around the time when the user 308 captured and/or submitted the frame(s) depicting the AV 102, the feedback system 164 can retrieve any of the relevant frames collected by the other AVs that depict the AV 102 during a relevant period of time. The feedback system 164 can provide a video from the other AVs to the client computing device 170 of the user 308 for presentation (e.g., via the user interface) and/or a screenshot from one or more frames captured by the other AVs.

Figure 4:
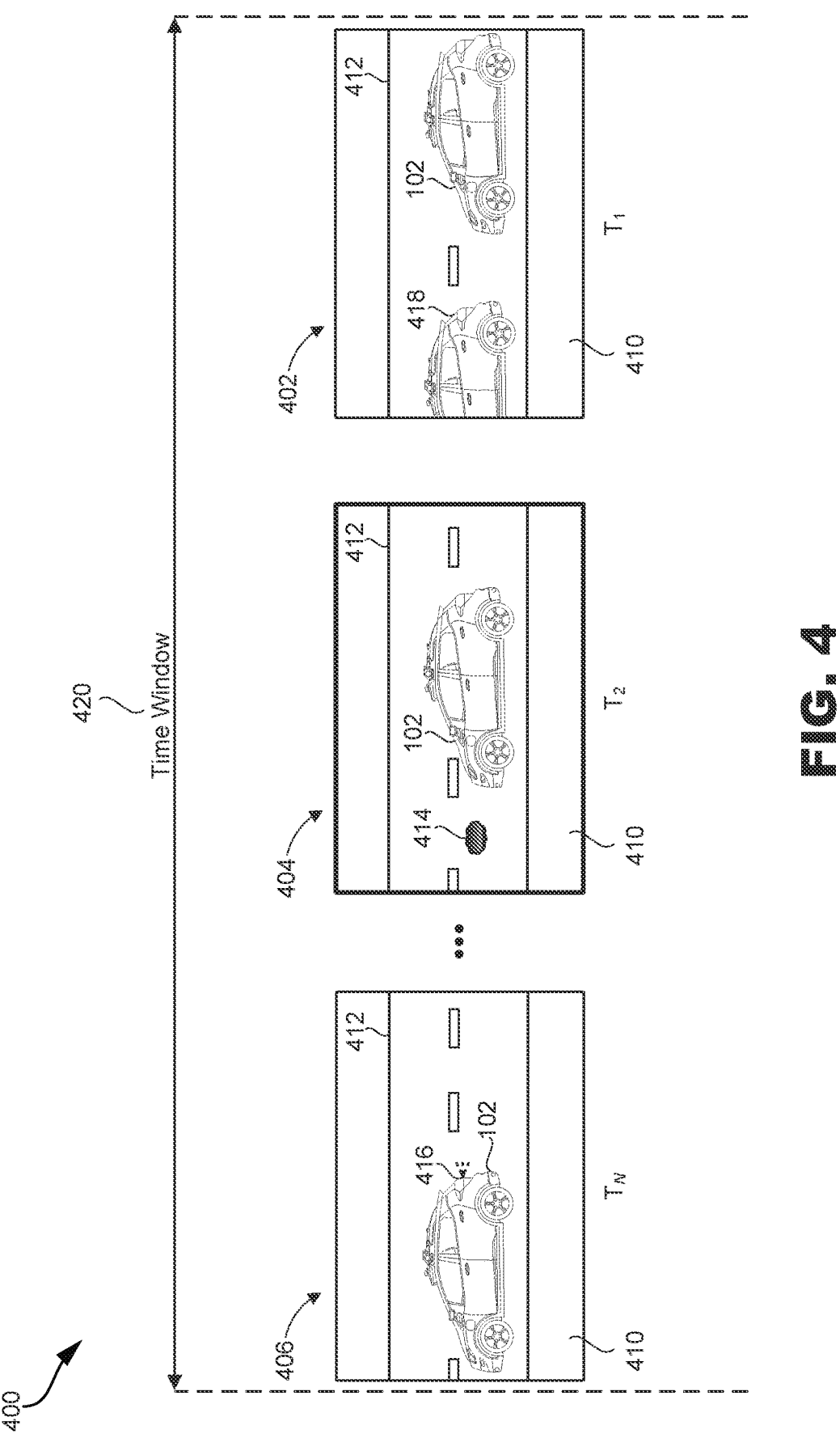
FIG. 4 is a diagram illustrating an example video relating to a situation involving an autonomous vehicle that provides context relating to a situation in a scene involving the autonomous vehicle, according to some examples of the present disclosure.

FIG. 4 is a diagram illustrating an example video 400 relating to a situation involving the AV 102 that provides context relating to the situation in a scene 410, according to some examples of the present disclosure. The situation can include any situation associated with the AV 102 reported by a user as further described herein. The video 400 can be or include a sequence of frames which, in this example, includes frame 402, frame 404, and frame 406. The frame 406 in this example is a frame captured and submitted by a user. For example, the frame 406 can include a frame captured by a user (e.g., via a client device such as the client computing device 170) when the user encountered/witnessed the AV 102 stopping on the side of the road 412 in the scene 410, as depicted in the frame 406. In some examples, the feedback system 164 can compile the video 400 by combining the frame 406 submitted by the user and frames 402 and 404 collected by the feedback system 164 as described herein. Here, the video 400 can include a sequence of frames that includes frames 402, 404, and 406. In other examples, the feedback system 164 can compile the video 400 by combining the frames 402 and 404 but excluding the frame 406 posted by the user. In such examples, the video 400 can include frames 402 and 404.

The frames 402 and 404 of the video 400 collected by the feedback system 164 can include frames captured by one or more vehicles (e.g., AV 102 and/or another AV(s) in a fleet) during a relevant time window 420. The relevant time window 420 can include a period of time before, during, and/or after the situation reported by the user (e.g., the situation depicted in the frame 406; namely, the AV 102 stopped on the side of the road 412). As previously noted, in some examples, the video 400 can be compiled by the feedback system 164 based on the frame 406 submitted by the user and the frames 402 and 404 collected by the feedback system 164 from one or more AVs that were in the scene 410 during the relevant time window 420 (e.g., during a time(s) before the situation occurred, a time(s) during the situation, and/or a time(s) after the situation). The one or more AVs from which the feedback system 164 can collect the frames 402 and 404 can include the AV 102 and/or one or more other AVs that were in the scene 410 at the relevant time window 420, such as AV 418 and/or any other AV in a fleet that was located at the scene 410 during the relevant time window 420 (e.g., during the situation, a certain amount of time before the situation, and/or a certain amount of time after the situation).

In some examples, the feedback system 164 can use the video 400 (and/or the frames 402 and 404) to provide a user(s) (e.g., user 308) a context of the situation to better inform the user(s) about the situation, such as an event associated with the situation, an error/failure or problem associated with the situation, a cause of an error or problem associated with the situation, a role of the AV 102 in the situation, a behavior/operation of the AV 102 during a relevant period of time (e.g., before, during, and/or after the situation), information about the scene 410 associated with the situation, a condition associated with the situation, and/or any other context and/or information. In some cases, the feedback system 164 can provide the video 400 (and/or the frames 402 and 404) to the client device (e.g., client computing device 170) of the user who reported the AV 102 (e.g., the client device of a user who submitted the frame 406), can post the video 400 (and/or the frames 402 and 404) in/to a social media network as a reply to a post that includes the frame 406 depicting the AV 102, can post or upload the video 400 (and/or the frames 402 and 404) to a blog or website and associate the video 400 (and/or the frames 402 and 404) with a user post or upload that includes the frame 406 depicting the AV 102, can provide the video 400 (and/or the frames 402 and 404) to one or more users and/or entities (e.g., an emergency responder, an owner of a vehicle involved in or affected by the situation, a transportation authority, a business, etc.) to provide more information about the situation, can submit or publish the video 400 (and/or the frames 402 and 404) in response to a user posting or publishing the frame 406 depicting the AV 102 in a situation to provide additional information about the situation (e.g., additional information beyond the information provided by the frame 406), and/or otherwise provide the video 400 (and/or the frames 402 and 404) as a reply to a user, business, post, comment, upload, publication, or communication that includes the frame 406 depicting the AV 102 in a situation.

As previously noted, in this example the frame 406 depicts the AV 102 stopped on a side of the road 412 in the scene 410 with its emergency lights 416 activated. The frames 402 and 404 depict the AV 102 prior to stopping on the side of the road 412. The frame 404 shows a pothole 414 on the road 412 that may have caused the AV 102 to stop on the side of the road 412. The pothole 414 is not visible in the frame 402 because it is occluded/obstructed/hidden by another vehicle 418 on the road 412. Moreover, the pothole 414 is not visible in the frame 406 as it is occluded/obstructed/hidden by the AV 102. Thus, without more context, the AV 102 in the frame 406 may appear to a viewer of the frame 406 to have stopped on the side of the road 412 for no reason. Consequently, a user who views the frame 406 and does not have the frame 404 may assume, from the depiction of the AV 102 and the scene 410 in the frame 406, that the AV 102 stopped for no reason or perhaps experienced an error or failure and is in a stuck state. Accordingly, any viewers of the frame 406 may need access to the frame 404 to get a better understanding of the situation and context that led to the AV 102 stopping on the side of the road 412 as depicted in the frame 406.

In some examples, if a user submits the frame 406 (e.g., sends the frame 406 to the feedback system 164 or posts the frame 406 in a site such as a social media site, a blog, a webpage, etc.) to report the AV 102 in the scene 410, the feedback system 164 may gather the frame 404 and provide the frame 404 in response to the user's submission of the frame 406. In some cases, the feedback system 164 may gather and provide additional frames, such as frame 402, to provide additional information and context about the scene 410 and/or the situation. The feedback system 164 can provide the frame 404 (and, in some cases, the frame 402) for additional information about the situation and context so anyone who views the frame 406 can get a better understanding of the situation, the context, and/or why the AV 102 stopped on the side of the road 412.

For example, if a user posts the frame 406 on a social media network and includes a tag used to identify posts related to the AV 102 (and/or related to any AVs in a fleet including the AV 102), the feedback system 164 can find and analyze the posted frame 406 to gain insight/feedback about the situation involving the AV 102. In some cases, the feedback system 164 can also determine what action(s) to take in response to the posting of the frame 406 (and/or the information conveyed by the posted frame 406). The feedback system 164 can analyze the frame 406 and detect that the AV 102 appears to be in a stopped or stuck state. The feedback system 164 can determine that, based on the frame 406, it may not be clear to users viewing the frame 406 why the AV 102 stopped as it did. The feedback system 164 may determine to obtain other frames, such as frame 402 and frame 404, depicting the scene 410 prior to the AV 102 stopping on the side of the road 412 (e.g., prior to the time when the frame 406 was captured) to obtain more context of the situation and better understand the situation. In some cases, the feedback system 164 can retrieve the frames 402 and 404 and post the frames 402 and 404 on the site (e.g., as a reply to the post from the user) to provide viewers of the frame 406 additional context and information about what happened to the AV 102 in the scene 410.

The feedback system 164 can obtain the frames 402 and 404 from the AV 102 and/or another vehicle that was present in the scene 410 at or within the relevant time window 420, such as another AV in a fleet. In this example, the feedback system 164 can obtain the frames 402 and 404 from another AV(s) that was present in the scene 410 before the AV 102 stopped on the side of the road 412 and collected frames while present in the scene 410. The frames 402 and 404 from the other AV(s) in the scene 410 depict the AV 102 in the scene 410 and provide context about the situation associated with the AV 102. For example, the frame 402 depicts the AV 102 prior to approaching the pothole 414 on the road 412, and the frame 404 depicts the pothole 414 on the road 412, which is not visible in the frame 406 and may have caused the AV 102 to stop on the side of the road 412 as depicted in the frame 406.

In some cases, the feedback system 164 can highlight or edit one or more frames that the feedback system 164 determines provide relevant information for understanding the context and situation of a reported AV (e.g., AV 102), or may prompt a user to provide an input identifying or highlighting one or more frames that provide relevant information for understanding the context and situation. For example, in FIG. 4, the frame 404 is highlighted to indicate that the frame 404 depicts information that is relevant to understanding the situation. In this example, the frame 404 depicts the pothole 414 on the road 412, which may have caused the AV 102 to stop on the side of the road 412. Therefore, the frame 404 can be highlighted as shown in FIG. 4 to indicate that the frame 404 depicts relevant contextual information for understanding the situation (e.g., the pothole 414 on the road 412). When a user views the posted frame 406, the frames 402 and 404 can also be available to the user to consume to better understand the situation depicted in the posted frame 406. The frame 404 can be highlighted as shown to indicate to the user that the frame 404 provides relevant information (e.g., relevant context) so the user can refer to the frame 404 if the user wishes to better understand the situation depicted in the frame 406.

In some cases, if a user submits a frame (e.g., frame 406) reporting an AV and the situation and/or context is not clear from the frame, the feedback system 164 can collect additional frames and provide them to the user. When providing the additional frames, the feedback system 164 can request input from the user to help identify a relevant frame that depicts/conveys relevant contextual information, help identify one or more regions of a relevant frame that depict relevant contextual information (e.g., that depicts a behavior associated with the situation, a cause of the situation, activity in the scene at one or more relevant times associated with the situation, etc.), and/or help identify what the user intended to report and/or believes is relevant to what the user intended to report. For example, the user can select and/or annotate a frame (or a portion of a frame) to identify a frame and/or something in the frame that the user believes is relevant to the situation, to identify what the user intends to report (e.g., a scene agent/element, a condition, an event, an action/activity, a state, a hazard, an object, etc.), and/or to provide any other feedback to the feedback system 164. In some examples, the user can provide an input to select or flag a relevant frame or something in the relevant frame.

To illustrate, the feedback system 164 can provide the frames 402 and 404 to the user who submitted the frame 406 that depicts the AV 102 stopped on the side of the road 412. The feedback system 164 can ask the user to identify which of the frames provides relevant information about the situation depicted in the frame 406, such as a context or potential cause for the situation, or to identify something in any of the frames that the user believes is relevant. In the example shown in FIG. 4, the user may have selected the frame 404 as the frame 404 depicts the pothole 414 that may have caused the AV 102 to stop and/or provides relevant context leading up to the situation depicted in the frame 406. In response to (or based on) the user selection, the frame 404 can be highlighted as shown in FIG. 4, which can indicate that the frame 404 was selected or identified by the user in response to the request from the feedback system 164 to identify a relevant frame(s) or something in the relevant frame(s) that may help understand the situation depicted in the frame 406 submitted by the user.

The selection or highlight of the frame 404 in FIG. 4 is merely a non-limiting illustrative example of a user input provided by a user when provided additional frames relating to a situation. Any other types of user inputs and input requests/prompts are also possible. For example, in some cases, the user can crop a frame (e.g., frame 404) to remove content deemed less relevant by the user or focus the frame on the most relevant content. As another example, the user may annotate a frame to provide additional information or feedback. For example, the user can draw a box around the pothole 414 in the frame 404 or tag/label the pothole 414 to indicate that the user believes the pothole 414 is relevant to the situation depicted in the frame 406, the pothole 414 is believed to be the cause of the situation, the user intended to report the pothole 414 and/or a behavior of the AV 102 when encountering the pothole 414, and/or any other information or feedback relating to the pothole 414 and the situation.

As yet another example, the user can draw a path in the frame 404 suggested by the user as a user recommendation for avoiding or handling the situation. To illustrate, in the example of FIG. 4, the road 412 in the scene 410 includes two lanes and the pothole 414 is located on the lane in which the AV 102 is traveling. Here, the user can draw a path from the lane that the AV 102 is traveling (e.g., the lane where the pothole 414 is located) to the other lane on the road 412, which does not include the pothole 414, to indicate that the user would have recommended changing lanes according to the drawn path to avoid the pothole 414 and potentially avoid the situation (e.g., stopping on the side of the road 412). In other words, the path drawn by the user can serve as user feedback about the situation and can indicate that the user believes that a better way to handle the situation (e.g., the pothole 414) would be to follow the drawn path to switch lanes and thus avoid the pothole 414, rather than stopping on the side of the road 412 as depicted in the frame 406.

Figure 5:
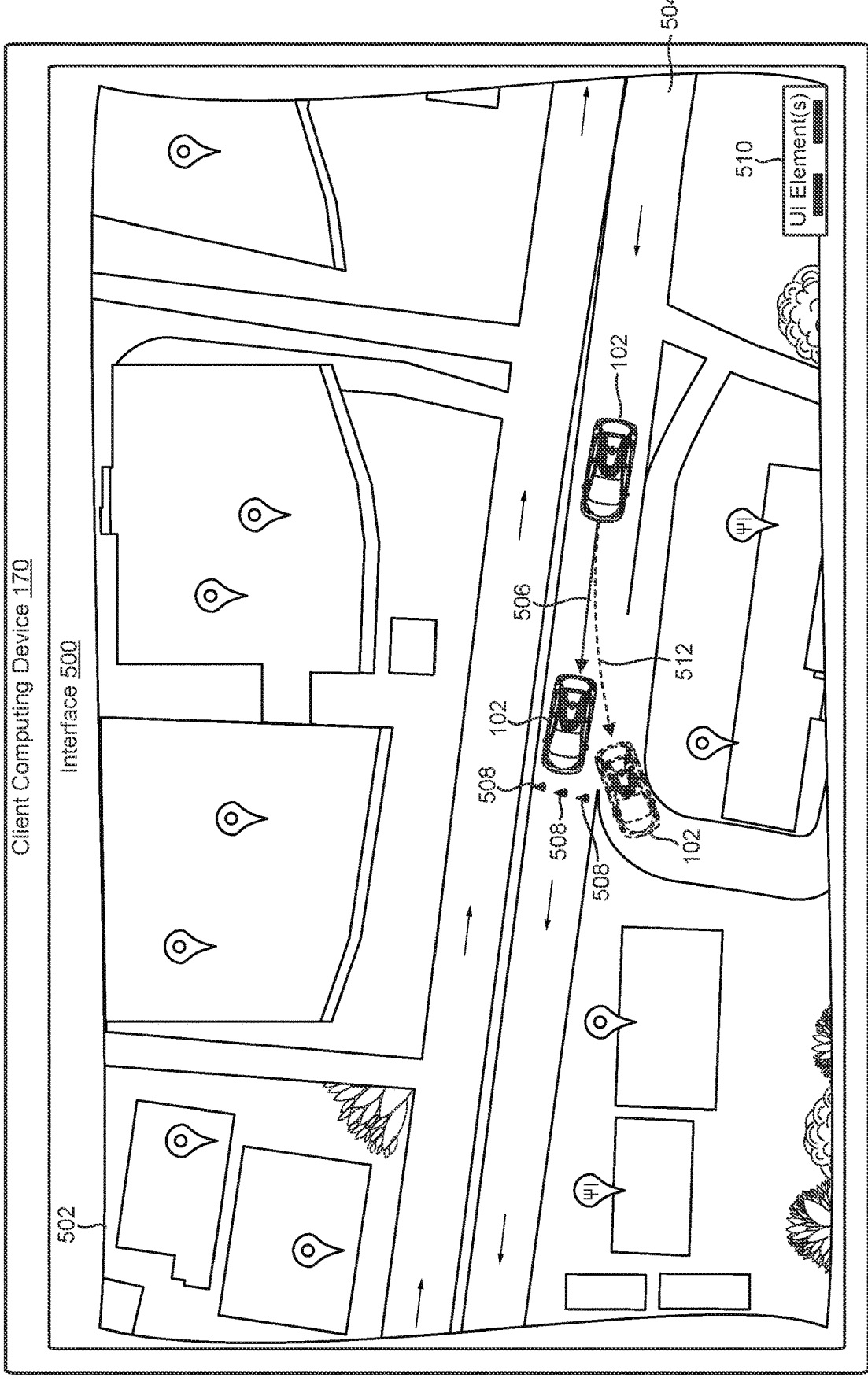
FIG. 5 is a diagram illustrating an example user interface that a user can use to provide feedback about a situation reported by the user regarding an autonomous vehicle, according to some examples of the present disclosure.

FIG. 5 is a diagram illustrating an example user interface that a user can use to provide feedback about an AV situation reported by the user, according to some examples of the present disclosure. In some examples, the feedback system 164 can provide a map 502 to a client computing device 170 of a user for presentation to the user on an interface 500. The map 502 can depict the AV 102 in an area associated with a situation encountered by the AV 102. For example, the map 502 can depict the AV 102 prior to performing a maneuver or reaching a state reported by a user as described herein. In some cases, the map 502 can include one or more static and/or dynamic objects and/or elements generated based on (and/or included, depicted, and/or represented in) sensor data collected by the AV 102 (and/or sensor data collected by any other AV in the scene) before, during, and/or after the AV situation. For example, the feedback system 164 can generate and/or render the map 502 to include static and/or dynamic objects and/or elements detected by the AV 102 based on sensor data collected by the AV 102 while navigating the scene and/or detected by the data center 150 from the sensor data collected by the AV 102 (and/or sensor data collected by any other AVs in the scene). Non-limiting examples of static and dynamic objects and elements that can be included in the map 502 include traffic cones (e.g., traffic cones 508), pedestrians, other vehicles, animals, obstacles, lanes and/or lane markings, crosswalks, intersections, traffic signs, egress/ingress ramps, sidewalks, buildings, trees, road hazards, roadway/traffic medians and/or barriers, construction zone objects, and/or any other objects and/or elements in a scene.

In this example, the map 502 depicts the AV 102 on a road 504, a path 506 on the road 504 taken by the AV 102 until stopping prior to a set of traffic cones 508 placed on the road 504 to block a portion of the road 504. The AV 102 may have failed to detect the traffic cones 508 in time to perform a reroute and may have stopped upon detecting the traffic cones 508 and determining that the AV 102 cannot proceed past the traffic cones 508. The user associated with the client computing device 170 may have reported the situation (e.g., the AV 102 stopping before the traffic cones 508 potentially because the AV 102 failed to detect the traffic cones 508 with sufficient time to reroute) as described herein. In some examples, the feedback system 164 can provide the map 502 to the client computing device 170 for presentation on the interface 500 to solicit input/feedback from the user in response to the user reporting the situation.

The interface 500 can allow the user to provide feedback or additional information associated with a situation involving the AV 102. For example, the interface 500 can allow the user to provide input indicating how the user believes the AV 102 should have behaved/operated in the given situation, how the user believes the AV 102 can resolve the situation, what the user believes to be the cause of the situation, what the user believes can be improved in the situation, what the user intended to report about the AV 102 and/or the situation, and/or any other input. To illustrate, the user can use the interface 500 to draw or identify a path in the map 502 for the AV 102, such as a different path that the user believes (or recommends) the AV 102 should have taken given the situation reported by the user (and/or to avoid or handle/ address the situation).

In the example shown in FIG. 5, the user has drawn a path 512 in the map 502 that represents a recommended path for the AV 102 that the user believes the AV 102 should have taken instead of the path 506 taken by the AV 102. The user can draw the path 512 using a touch input(s); an input using an input device such as a mouse, keyboard, or controller; an input using a voice command or a visual gesture detected by the client computing device 170 (or the feedback system 164); or any other type of input using any other type of input device. The client computing device 170 can display the input from the user (e.g., the path 512) and can provide the input to the feedback system 164. In some examples, the client computing device 170 can automatically provide the input from the user to the feedback system 164. In other examples, the client computing device 170 can provide the input from the user to the feedback system 164 upon the user providing an input indicating that the provided input is finalized and/or requesting that the provided input be submitted.

In some cases, the feedback system 164 may only request additional information about the AV situation from the user and/or allow the user to provide additional information about the AV situation if the user has a certain trust and/or reliability level with the feedback system 164 and/or if the user has been authorized and/or authenticated by the feedback system 164. For example, the feedback system 164 may only provide the interface 500 to the user for the user to provide additional information about the AV situation and/or may only enable the user to input additional information about the AV situation through the interface 500 if the user (and/or a user account of the user) has a certain trust and/or reliability level. The trust and/or reliability level of the user can be determined based on one or more factors such as, for example and without limitation, a number (and/or percentage) of times that the user reported information about an AV that was verified and/or determined to be valid/accurate and/or credible, a number (and/or percentage) of times that the user reported information about an AV that was not verified and/or determined to be invalid/inaccurate and/or not credible, a status and/or history of a user account (e.g., active account, inactive account, premium account, standard account, user account activity and/or statistics, etc.) registered by/for the user in association with one or more AV services, whether information provided by the user can be (or has been) corroborated, the type of information previously provided by the user, the type of information being requested from and/or provided by the user, whether the identity of the user is or has been verified, whether the user has securely authenticated using a user account or any other security protocol when providing information about an AV and/or interacting with the feedback system 164, and/or any other factor.

In some cases, the feedback system 164 may allow any user to provide additional information about an AV or AV situation. In some examples, the feedback system 164 may allow any user to provide additional information about an AV or AV situation but may weight such information (e.g., may weight how to treat such information, how react to such information, and/or how much credibility to assign to such information) based on a trust and/or reliability level of the user. For example, the feedback system 164 may allow the user associated with the client computing device 170 to provide additional information about the AV situation in FIG. 5 but may assign a weight to such information based on a trust and/or reliability level of the user in order to determine whether the information needs to be validated/corroborated (and/or how much validation/corroboration is needed), how such information is treated, how react to such information, etc. In some cases, the feedback system 164 may weight the information from the user based on a trust and/or reliability level of the user as well as an estimated likelihood that such information is accurate, an amount of corroborating information, information obtained from sensor data collected by one or more AVs in the scene, and/or any other information.

In some examples, the interface 500 can include one or more user interface (UI) elements 510 that the user can use to provide one or more inputs. The one or more UI elements 510 can include, for example and without limitation, one or more buttons, one or more text fields, one or more interface objects, one or more controls, one or more input tools, one or more input options, one or more input functions, and/or any other types of input elements. For example, the one or more UI elements 510 can include a field where the user can add text or comments, tag or label objects and/or portions of the content displayed in the interface 500, add/remove or modify interface elements (e.g., add a visual line representing a location where the user believes the AV 102 should stop or should have stopped, remove a visual line representing a location where the user believes the AV 102 incorrectly stopped, tag an element in the scene that the user believes the AV 102 may have not correctly detected or recognized, etc.).

In some cases, the feedback system 164 can provide incentives for users to provide feedback relating to reported situations. For example, the feedback system 164 can provide credits, rewards, discounts, upgrades, and/or any other incentives to the user for providing the feedback identifying the path 512 that the user believes the AV 102 should have taken.

FIG. 6 is a flowchart illustrating an example process 600 for crowdsourcing user feedback about an AV (e.g., AV 102), according to some examples of the present disclosure. At block 602, the process 600 can include obtaining a frame captured by a client device (e.g., client computing device 170) and shared by a user of the client device. The frame can depict an AV in a scene where the frame was captured. In some examples, the user can capture the frame when it encounters a situation involving the AV that the user wants to report. The user can share the frame to report the situation. In some cases, the user can share the frame by sending the frame to the feedback system 164, posting the frame in a site (e.g., a social media network, a blog, a communications platform, etc.), uploading the frame to a site (e.g., a website, etc.), or in any other way.

At block 604, the process 600 can include identifying the AV depicted in the frame based at least in part on a content of the frame. For example, the process 600 can use a computer vision or machine learning algorithm to identify the AV based on the depiction of the AV in the frame.

In some cases, identifying the AV depicted in the frame can include extracting one or more features in the frame corresponding to the AV depicted in the frame; determining one or more AV characteristics based on the one or more features extracted; and identifying the AV depicted in the frame based on the one or more AV characteristics.

In some cases, identifying the AV depicted in the frame can include determining a location of the client device at a time when the client device captured or shared the frame;

comparing the location of the client device at the time when the client device captured or shared the frame with a set of tracked locations of a set of AVs determined to be present in the scene at the time when the client device captured or shared the frame; based on the comparing of the location of the client device with the set of tracked locations, identifying one or more AVs from the set of AVs; and identifying the AV depicted in the frame based on the content of the frame and at least one of the one or more AVs that were present in the scene at the time when the client device captured or shared the frame and/or a respective tracked location of each of the one or more AVs at the time when the client device captured or shared the frame. The set of AVs can include the AV. Moreover, in some examples, the location of the client device can be determined based on location information included in metadata of the frame and/or location information provided by a client application (e.g., ridehailing application 172) used to share the frame.

In some aspects, identifying the AV depicted in the frame can include determining, based on sensor data from each AV from the set of AVs, a respective orientation of each AV at the time when the client device captured or shared the frame; determining a depicted orientation of the AV in the frame and/or an orientation of the client device at the time when the client device captured or shared the frame; and determining which AV from the set of AVs is the AV depicted in the frame based on the respective orientation of each AV at the time when the client device captured or shared the frame, the depicted orientation of the AV in the frame, and/or the orientation of the client device at the time when the client device captured or shared the frame.

At block 606, the process 600 can include determining, based at least in part on the frame, an issue experienced by the AV in the scene. In some examples, the issue can include an AV error, an AV failure, an AV condition, an AV state, and/or an AV behavior.

In some aspects, the process 600 can include determining, based on the frame shared by the user, that the frame represents a notification from the user about a situation experienced by the AV in the scene; and determining, based at least in part on the frame and sensor data from the AV, that the situation includes the issue experienced by the AV in the scene.

At block 608, the process 600 can include determining an action to take in response to the frame shared by the user and/or the issue experienced by the AV. The action to take in response to the frame shared by the user (and/or the sharing of the frame by the user) and/or the issue experienced by the AV can include, for example and without limitation, generating a reply to/for the user, collecting and sharing sensor data that provides additional information associated with the issue, requesting feedback or inputs from the user, requesting and/or providing assistance to the AV, sending one or more remote commands to the AV, adjusting one or more components of the AV (e.g., a software, a hardware, a mechanical system, a map, an operational design domain, a rule, a policy, a restriction, a parameter, a sensor, a setting, etc.), and/or any other action.

In some cases, determining the action to take in response to the frame shared by the user and/or the issue experienced by the AV can include determining to request feedback from the user about a situation of the AV associated with the frame. In some aspects, the process 600 can include sending, to the client device, user interface content for presentation at the client device; and receiving, from the client device, one or more user inputs provided via a user interface that includes the user interface content. In some examples, the user interface content can request information from the user about the AV.

In some examples, the user interface content can include a map depicting the AV in the scene, one or more frames collected by one or more AVs that were present in the scene when the frame was captured or shared, and/or one or more interface input elements. In some cases, the one or more inputs can define a path in the map suggested by the user for the AV to take instead of an actual path taken by the AV when navigating the scene.

In some cases, determining the action to take in response to the frame shared by the user and/or the issue experienced by the AV can include determining that the frame is missing context information relating to the issue experienced by the AV; determining, from a set of frames collected by one or more AVs that were present in the scene when the frame was captured or shared, one or more frames in the set of frames determined to provide the missing contextual information relating to the issue experienced by the AV; and providing the one or more frames in a reply to a post from the user sharing the frame depicting the AV.

In some cases, the feedback system 164 may request the missing contextual information from the user and/or allow the user to provide the missing contextual information. In some examples, the feedback system 164 may only request the missing contextual information from the user and/or allow the user to provide the missing contextual information if the user has a certain trust and/or reliability level with the feedback system 164 and/or if the user has been authorized and/or authenticated by the feedback system 164. For example, the feedback system 164 may only request and/or accept the missing contextual information from the user if the user (and/or a user account of the user) has a certain trust and/or reliability level. The trust and/or reliability level of the user can be determined based on one or more factors such as, for example and without limitation, a number (and/or percentage) of times that the user reported information about an AV that was verified and/or determined to be valid/accurate and/or credible, a number (and/or percentage) of times that the user reported information about an AV that was not verified and/or determined to be invalid/inaccurate and/or not credible, a status and/or history of a user account (e.g., active account, inactive account, premium account, standard account, user account activity and/or statistics, etc.) registered by/for the user in association with one or more AV services, whether information provided by the user can be (or has been) corroborated, the type of information previously provided by the user, the type of information being requested from and/or provided by the user, whether the identity of the user is or has been verified, whether the user has securely authenticated using a user account or any other security protocol when providing information about an AV and/or interacting with the feedback system 164, and/or any other factor.

In some cases, the feedback system 164 may allow any user to provide the missing contextual information (and/or any other information). In some examples, the feedback system 164 may allow any user to provide the missing contextual information but may weight such information (e.g., may weight how to treat such information, how react to such information, and/or how much credibility to assign to such information) based on a trust and/or reliability level of the user. For example, the feedback system 164 may allow the user to provide the missing contextual information but may assign a weight to such information from the user based on a trust and/or reliability level of the user, in order to determine whether the information needs to be validated/corroborated (and/or how much validation/corroboration is needed), how such information is treated, how react to such information, etc. In some cases, the feedback system 164 may weight the information from the user based on a trust and/or reliability level of the user as well as an estimated likelihood that such information is accurate, an amount of corroborating information, information obtained from sensor data collected by one or more AVs in the scene, and/or any other information.

In some aspects, the process 600 can include, in response to a determination that the frame does not provide sufficient information to determine with a threshold confidence a situation being reported by the user through sharing of the frame, obtaining, from the AV, sensor data collected by the AV during a period of time when the AV was present in the scene; determining, based on the content of the frame and the sensor data obtained from the AV, an activity or condition of the AV during the period of time when the AV was present in the scene; and determining the issue experienced by the AV in the scene based on the activity or condition of the AV during the period of time when the AV was present in the scene. In some examples, the period of time can include a time when the client device captured or shared the frame, an amount of time before the time when the client device captured or shared the frame, and/or an amount of time after the time when the client device captured or shared the frame.

Figure 7:
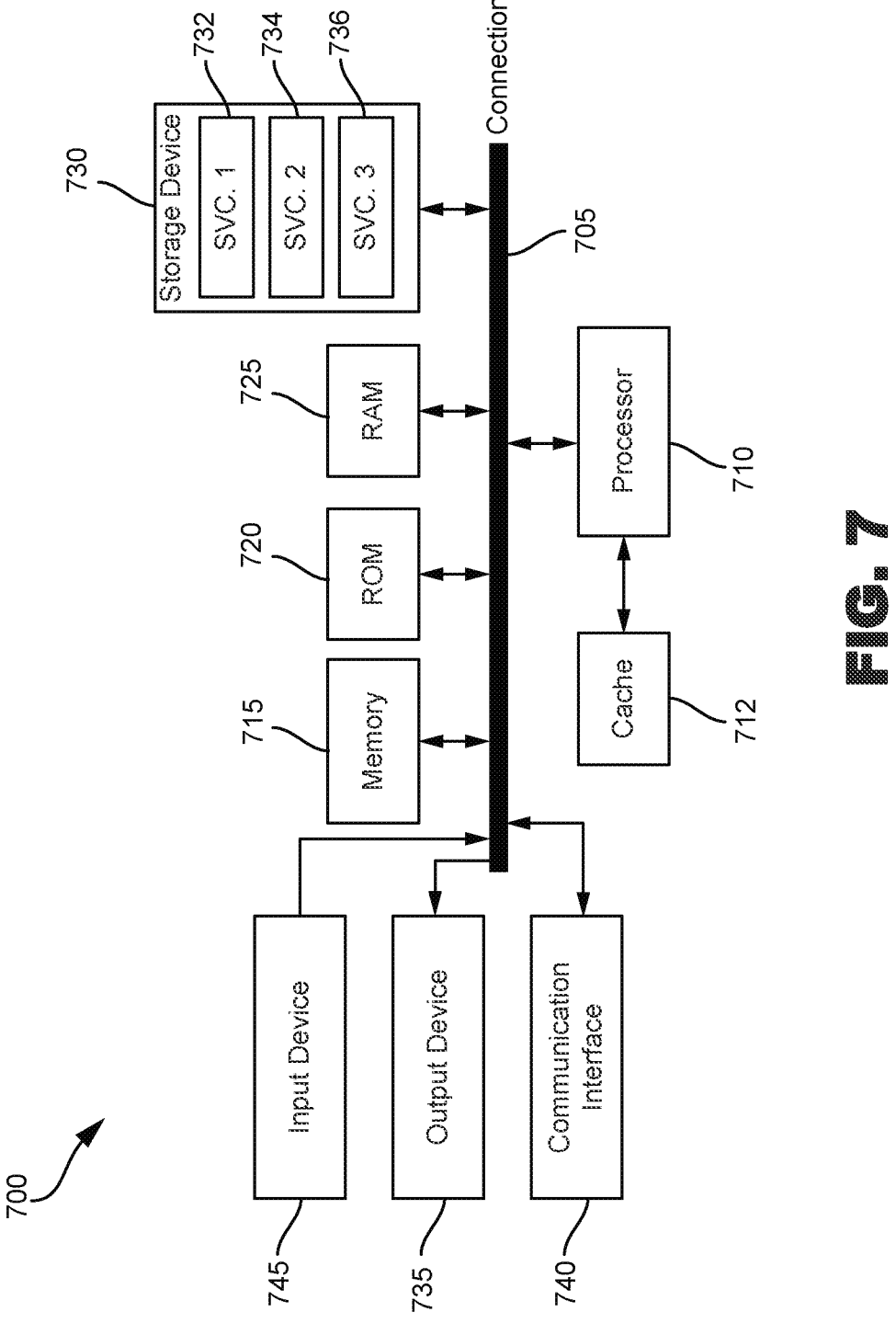
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up local computing device 110, datacenter 150, a passenger device (e.g., client computing device 170) executing the ridehailing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory and one or more processors coupled to the memory, the one or more processors configured to: obtain a frame captured by a client device and shared by a user of the client device, wherein the frame depicts an autonomous vehicle (AV) in a scene where the frame was captured; identify the AV depicted in the frame based at least in part on a content of the frame; determine, based at least in part on the frame, an issue experienced by the AV in the scene; and determine an action to take in response to at least one of the frame shared by the user and the issue experienced by the AV.

Aspect 2. The system of Aspect 1, wherein identifying the AV depicted in the frame comprises: extracting one or more features in the frame, the one or more features corresponding to the AV depicted in the frame; determining one or more AV characteristics based on the one or more features extracted; and identifying the AV depicted in the frame based on the one or more AV characteristics.

Aspect 3. The system of any of Aspects 1 to 2, wherein identifying the AV depicted in the frame further comprises: determining a location of the client device at a time when the client device captured or shared the frame, the location of the client device being determined based on at least one of location information included in metadata of the frame and location information provided by a client application used to share the frame; comparing the location of the client device at the time when the client device captured or shared the frame with a set of tracked locations of a set of AVs determined to be present in the scene at the time when the client device captured or shared the frame, wherein the set of AVs comprises the AV; based on the comparing of the location of the client device with the set of tracked locations, identifying one or more AVs from the set of AVs; and identifying the AV depicted in the frame based on the content of the frame and at least one of the one or more AVs that were present in the scene at the time when the client device captured or shared the frame and a respective tracked location of each of the one or more AVs at the time when the client device captured or shared the frame.

Aspect 4. The system of Aspect 3, wherein identifying the AV depicted in the frame further comprises: determining, based on sensor data from each AV from the set of AVs, a respective orientation of each AV at the time when the client device captured or shared the frame; determining at least one of a depicted orientation of the AV in the frame and an orientation of the client device at the time when the client device captured or shared the frame; and determining which AV from the set of AVs is the AV depicted in the frame based on at least one of the respective orientation of each AV at the time when the client device captured or shared the frame, the depicted orientation of the AV in the frame, and the orientation of the client device at the time when the client device captured or shared the frame.

Aspect 5. The system of any of Aspects 1 to 4, wherein the one or more processors are configured to: determine, based on the frame shared by the user, that the frame represents a notification from the user about a situation experienced by the AV in the scene; and determine, based at least in part on the frame and sensor data from the AV, that the situation comprises the issue experienced by the AV in the scene, wherein the issue comprises at least one of an AV error, an AV failure, an AV condition, an AV state, and an AV behavior.

Aspect 6. The system of any of Aspects 1 to 5, wherein the one or more processors are configured to: in response to a determination that the frame does not provide sufficient information to determine with a threshold confidence a situation being reported by the user through sharing of the frame, obtain, from the AV, sensor data collected by the AV during a period of time when the AV was present in the scene, the period of time comprising at least one of a time when the client device captured or shared the frame, an amount of time before the time when the client device captured or shared the frame, and an amount of time after the time when the client device captured or shared the frame; determine, based on the content of the frame and the sensor data obtained from the AV, an activity or condition of the AV during the period of time when the AV was present in the scene; and determine the issue experienced by the AV in the scene based on the activity or condition of the AV during the period of time when the AV was present in the scene.

Aspect 7. The system of any of Aspects 1 to 6, wherein determining the action to take in response to at least one of the frame shared by the user and the issue experienced by the AV comprises determining to request feedback from the user about a situation of the AV associated with the frame, wherein the one or more processors are configured to: send, to the client device, user interface content for presentation at the client device, the user interface content requesting information from the user about the AV; and receive, from the client device, one or more user inputs provided via a user interface comprising the user interface content.

Aspect 8. The system of Aspect 7, wherein the user interface content comprises at least one of a map depicting the AV in the scene, one or more frames collected by one or more AVs that were present in the scene when the frame was captured or shared, and one or more interface input elements.

Aspect 9. The system of Aspect 8, wherein the one or more inputs define a path in the map suggested by the user for the AV to take instead of an actual path taken by the AV when navigating the scene.

Aspect 10. The system of any of Aspects 1 to 9, wherein determining the action to take in response to at least one of the frame shared by the user and the issue experienced by the AV comprises: determining that the frame is missing context information relating to the issue experienced by the AV; determining, from a set of frames collected by one or more AVs that were present in the scene when the frame was captured or shared, one or more frames in the set of frames determined to provide the missing contextual information relating to the issue experienced by the AV; and providing the one or more frames in a reply to a post from the user sharing the frame depicting the AV.

Aspect 11. A method comprising: obtaining a frame captured by a client device and shared by a user of the client device, wherein the frame depicts an autonomous vehicle (AV) in a scene where the frame was captured; identifying the AV depicted in the frame based at least in part on a content of the frame; determining, based at least in part on the frame, an issue experienced by the AV in the scene; and determining an action to take in response to at least one of the frame shared by the user and the issue experienced by the AV.

Aspect 12. The method of Aspect 11, wherein identifying the AV depicted in the frame comprises: extracting one or more features in the frame, the one or more features corresponding to the AV depicted in the frame; determining one or more AV characteristics based on the one or more features extracted; and identifying the AV depicted in the frame based on the one or more AV characteristics.

Aspect 13. The method of any of Aspects 11 to 12, wherein identifying the AV depicted in the frame further comprises: determining a location of the client device at a time when the client device captured or shared the frame, the location of the client device being determined based on at least one of location information included in metadata of the frame and location information provided by a client application used to share the frame; comparing the location of the client device at the time when the client device captured or shared the frame with a set of tracked locations of a set of AVs determined to be present in the scene at the time when the client device captured or shared the frame, wherein the set of AVs comprises the AV; based on the comparing of the location of the client device with the set of tracked locations, identifying one or more AVs from the set of AVs; and identifying the AV depicted in the frame based on the content of the frame and at least one of the one or more AVs that were present in the scene at the time when the client device captured or shared the frame and a respective tracked location of each of the one or more AVs at the time when the client device captured or shared the frame.

Aspect 14. The method of Aspect 13, wherein identifying the AV depicted in the frame further comprises: determining, based on sensor data from each AV from the set of AVs, a respective orientation of each AV at the time when the client device captured or shared the frame; determining at least one of a depicted orientation of the AV in the frame and an orientation of the client device at the time when the client device captured or shared the frame; and determining which AV from the set of AVs is the AV depicted in the frame based on at least one of the respective orientation of each AV at the time when the client device captured or shared the frame, the depicted orientation of the AV in the frame, and the orientation of the client device at the time when the client device captured or shared the frame.

Aspect 15. The method of any of Aspects 11 to 14, further comprising: determining, based on the frame shared by the user, that the frame represents a notification from the user about a situation experienced by the AV in the scene; and determining, based at least in part on the frame and sensor data from the AV, that the situation comprises the issue experienced by the AV in the scene, wherein the issue comprises at least one of an AV error, an AV failure, an AV condition, an AV state, and an AV behavior.

Aspect 16. The method of any of Aspects 11 to 15, further comprising: in response to a determination that the frame does not provide sufficient information to determine with a threshold confidence a situation being reported by the user through sharing of the frame, obtaining, from the AV, sensor data collected by the AV during a period of time when the AV was present in the scene, the period of time comprising at least one of a time when the client device captured or shared the frame, an amount of time before the time when the client device captured or shared the frame, and an amount of time after the time when the client device captured or shared the frame; determining, based on the content of the frame and the sensor data obtained from the AV, an activity or condition of the AV during the period of time when the AV was present in the scene; and determining the issue experienced by the AV in the scene based on the activity or condition of the AV during the period of time when the AV was present in the scene.

Aspect 17. The method of any of Aspects 11 to 16, wherein determining the action to take in response to at least one of the frame shared by the user and the issue experienced by the AV comprises determining to request feedback from the user about a situation of the AV associated with the frame, the method further comprising: sending, to the client device, user interface content for presentation at the client device, the user interface content requesting information from the user about the AV; and receiving, from the client device, one or more user inputs provided via a user interface comprising the user interface content.

Aspect 18. The method of Aspect 17, wherein the user interface content comprises at least one of a map depicting the AV in the scene, one or more frames collected by one or more AVs that were present in the scene when the frame was captured or shared, and one or more interface input elements.

Aspect 19. The method of Aspect 18, wherein the one or more inputs define a path in the map suggested by the user for the AV to take instead of an actual path taken by the AV when navigating the scene.

Aspect 20. The method of any of Aspects 11 to 19, wherein determining the action to take in response to at least one of the frame shared by the user and the issue experienced by the AV comprises: determining that the frame is missing context information relating to the issue experienced by the AV; determining, from a set of frames collected by one or more AVs that were present in the scene when the frame was captured or shared, one or more frames in the set of frames determined to provide the missing contextual information relating to the issue experienced by the AV; and providing the one or more frames in a reply to a post from the user sharing the frame depicting the AV.

Aspect 21. A non-transitory computer-readable medium having stored thereon instructions which, when executed by one or more processors, cause the one or more processors to perform a method according to any of Aspects 11 to 20.

Aspect 22. A system comprising means for performing a method according to any of Aspects 11 to 20.

Aspect 23. A computer-program product comprising instructions which, when executed by one or more processors, cause the one or more processors to perform a method according to any of Aspects 11 to 20.

What is claimed is:

1. A system comprising:
a non-transitory memory storing instructions; and
one or more processors coupled to the memory, wherein the instructions, when executed by the one or more processors, cause the one or more processors to:
   obtain a frame captured by a client device and shared by a user of the client-device with the system, wherein the frame depicts an autonomous vehicle (AV) in a scene where the frame was captured, wherein the frame comprises an image or a frame of a video;
   determine an identity of the AV depicted in the frame based at least in part on the frame, wherein the identity uniquely identifies the AV, and wherein determining the identity of the AV depicted in the frame comprises:
      determining a location of the client device at a time when the client device captured or shared the frame;

determining, based on the location of the client device at the time when the client device captured or shared the frame and a set of tracked locations of a set of AVs, one or more AVs from the set of AVs that were present in the scene at the time when the client device captured or shared the frame;
      determining, based on sensor data from each AV from the one or more AVs, a respective orientation of each AV at the time when the client device captured or shared the frame;
      determining a depicted orientation of the AV in the frame;
      determining an orientation of the client device at the time when the client device captured or shared the frame; and
      determining which AV from the one or more AVs is depicted in the frame based on at least one of the respective orientation of each AV at the time when the client device captured or shared the frame, the depicted orientation of the AV in the frame, the orientation of the client device at the time when the client device captured or shared the frame, and at least one of which AV from the set of AVs is depicted in a foreground of the frame, is most centered within the frame, or is most contained within the frame;
   determine, based at least in part on the frame, an issue experienced by the AV in the scene;
   determine an action for the AV to take in response to the issue experienced by the AV to resolve the issue; and
   based on the action to take and the identity of the AV, send a remote command to the AV, wherein the remote command causes the AV to perform the action to resolve the issue.

2. The system of claim 1, wherein determining the identity of the AV depicted in the frame further comprises:
   extracting one or more features in the frame, the one or more features corresponding to the AV depicted in the frame;
   determining one or more AV characteristics based on the one or more features extracted; and
   identifying the AV depicted in the frame based on the one or more AV characteristics.

3. The system of claim 1, wherein determining the identity of the AV depicted in the frame further comprises:
   determining the location of the client device being determined based on at least one of location information included in metadata of the frame and location information provided by a client application used to share the frame.

4. The system of claim 1, wherein the instructions, when executed by the one or more processors, cause the one or more processors to also:
   determine, based on the frame shared by the user, that the frame represents a notification from the user about a situation experienced by the AV in the scene; and
   determine, based at least in part on the frame and sensor data from the AV, that the situation comprises the issue experienced by the AV in the scene, wherein the issue comprises at least one of an AV error, an AV failure, an AV condition, an AV state, and an AV behavior.

5. The system of claim 1, wherein the instructions, when executed by the one or more processors, cause the one or more processors to also:
   in response to a determination that the frame does not provide sufficient information to determine with a threshold confidence a situation being reported by the user through sharing of the frame, obtain, from the AV, sensor data collected by the AV during a period of time when the AV was present in the scene, the period of time comprising at least one of a time when the client device captured or shared the frame, an amount of time before the time when the client device captured or shared the frame, and an amount of time after the time when the client device captured or shared the frame;

determine, based on the frame and the sensor data obtained from the AV, an activity or condition of the AV during the period of time when the AV was present in the scene; and determine the issue experienced by the AV in the scene based on the activity or condition of the AV during the period of time when the AV was present in the scene.

6. The system of claim 1, wherein;

determining the action to take in response to at least one of the frame shared by the user and the issue experienced by the AV comprises determining to request feedback from the user about a situation of the AV associated with the frame; and wherein the instructions, when executed by the one or more processors, cause the one or more processors to also:

send, to the client device, user interface content for presentation at the client device, the user interface content requesting information from the user about the AV; and receive, from the client device, one or more user inputs provided via a user interface comprising the user interface content.

7. The system of claim 6, wherein the user interface content comprises at least one of a map depicting the AV in the scene, one or more frames collected by one or more AVs that were present in the scene when the frame was captured or shared, and one or more interface input elements.

8. The system of claim 7, wherein the one or more user inputs define a path in the map suggested by the user for the AV to take instead of an actual path taken by the AV when navigating the scene.

9. The system of claim 1, wherein determining the action for the AV to take in response to the issue experienced by the AV comprises:

determining that the frame is missing context information relating to the issue experienced by the AV;

determining, from a set of frames collected by the set of AVs that were present in the scene when the frame was captured or shared, one or more frames in the set of frames determined to provide the missing context contextual information relating to the issue experienced by the AV; and providing the one or more frames in a reply to a post from the user sharing the frame depicting the AV.

10. A method comprising:

obtaining a frame captured by a client device and shared by a user of the client device, wherein the frame depicts an autonomous vehicle (AV) in a scene where the frame was captured, wherein the frame comprises an image or a frame of a video;

determining an identity of the AV depicted in the frame based at least in part on the frame, wherein the identity uniquely identifies the AV, and wherein determining the identity of the AV depicted in the frame comprises:

determining a location of the client device at a time when the client device captured or shared the frame;

determining, based on the location of the client device at the time when the client device captured or shared the frame and a set of tracked locations of a set of AVs, one or more AVs from the set of AVs that were present in the scene at the time when the client device captured or shared the frame;

determining, based on sensor data from each AV from the one or more AVs, a respective orientation of each AV at the time when the client device captured or shared the frame;

determining a depicted orientation of the AV in the frame;

determining an orientation of the client device at the time when the client device captured or shared the frame; and determining which AV from the one or more AVs is depicted in the frame based on at least one of the respective orientation of each AV at the time when the client device captured or shared the frame, the depicted orientation of the AV in the frame, the orientation of the client device at the time when the client device captured or shared the frame, and at least one of which AV from the set of AVs is depicted in a foreground of the frame, is most centered within the frame, or is most contained within the frame;

determining, based at least in part on the frame, an issue experienced by the AV in the scene;

determining an action for the AV to take in response to the issue experienced by the AV to resolve the issue; and based on the action to take and the identity of the AV, sending a remote command to the AV, wherein the remote command causes the AV to perform the action to resolve the issue.

11. The method of claim 10, wherein determining the identity of the AV depicted in the frame further comprises:

extracting one or more features in the frame, the one or more features corresponding to the AV depicted in the frame;

determining one or more AV characteristics based on the one or more features extracted; and identifying the AV depicted in the frame based on the one or more AV characteristics.

12. The method of claim 10, wherein determining the identity of the AV depicted in the frame further comprises:

determining the location of the client device being determined based on at least one of location information included in metadata of the frame and location information provided by a client application used to share the frame.

13. The method of claim 10, further comprising:

determining, based on the frame shared by the user, that the frame represents a notification from the user about a situation experienced by the AV in the scene; and determining, based at least in part on the frame and sensor data from the AV, that the situation comprises the issue experienced by the AV in the scene, wherein the issue comprises at least one of an AV error, an AV failure, an AV condition, an AV state, and an AV behavior.

14. The method of claim 10, further comprising:

in response to a determination that the frame does not provide sufficient information to determine with a threshold confidence a situation being reported by the user through sharing of the frame, obtaining, from the AV, sensor data collected by the AV during a period of time when the AV was present in the scene, the period of time comprising at least one of a time when the client device captured or shared the frame, an amount of time before the time when the client device captured or shared the frame, and an amount of time after the time when the client device captured or shared the frame;

determining, based on the frame and the sensor data obtained from the AV, an activity or condition of the AV during the period of time when the AV was present in the scene; and determining the issue experienced by the AV in the scene based on the activity or condition of the AV during the period of time when the AV was present in the scene.

15. The method of claim 10, wherein:

determining the action to take in response to at least one of the frame shared by the user and the issue experienced by the AV comprises determining to request feedback from the user about a situation of the AV associated with the frame; and the method further comprising:

sending, to the client device, user interface content for presentation at the client device, the user interface content requesting information from the user about the AV; and receiving, from the client device, one or more user inputs provided via a user interface comprising the user interface content.

16. The method of claim 15, wherein the user interface content comprises a map depicting the AV in the scene, and wherein the one or more user inputs define a path in the map suggested by the user for the AV to take instead of an actual path taken by the AV when navigating the scene.

17. The method of claim 10, wherein determining the action to take in response to at least one of the frame shared by the user and the issue experienced by the AV comprises:

determining that the frame is missing context information relating to the issue experienced by the AV;

determining, from a set of frames collected by one or more AVs that were present in the scene when the frame was captured or shared, one or more frames in the set of frames determined to provide the missing context information relating to the issue experienced by the AV; and providing the one or more frames in a reply to a post from the user sharing the frame depicting the AV.

18. A non-transitory computer-readable medium having stored thereon instructions which, when executed by one or more processors, cause the one or more processors to:

obtain a frame captured by a client device and shared by a user of the client device, wherein the frame depicts an autonomous vehicle (AV) in a scene where the frame was captured, wherein the frame comprises an image or a frame of a video;

determine an identity of the AV depicted in the frame based at least in part on the frame, wherein the identity uniquely identifies the AV, and wherein determining the identity of the AV depicted in the frame comprises:

determining a location of the client device at a time when the client device captured or shared the frame;

determining, based on the location of the client device at the time when the client device captured or shared the frame and a set of tracked locations of a set of AVs, one or more AVs from the set of AVs that were present in the scene at the time when the client device captured or shared the frame;

determining, based on sensor data from each AV from the one or more AVs, a respective orientation of each AV at the time when the client device captured or shared the frame;

determining a depicted orientation of the AV in the frame;

determining an orientation of the client device at the time when the client device captured or shared the frame; and determining which AV from the one or more AVs is depicted in the frame based on at least one of the respective orientation of each AV at the time when the client device captured or shared the frame, the depicted orientation of the AV in the frame, the orientation of the client device at the time when the client device captured or shared the frame, and at least one of which AV from the set of AVs is depicted in a foreground of the frame, is most centered within the frame, or is most contained within the frame;

determine, based at least in part on the frame, an issue experienced by the AV in the scene;

determine an action for the AV to take in response to the issue experienced by the AV to resolve the issue; and based on the action to take and the identity of the AV, send a remote command to the AV, wherein the remote command causes the AV to perform the action to resolve the issue.

\*　\*　\*　\*　\*